United States Patent
Komiya et al.

(10) Patent No.: US 6,344,866 B1
(45) Date of Patent: Feb. 5, 2002

(54) LIGHT BEAM SCANNER UNIT WITH PASSING POSITION AND POWER CONTROL AND IMAGE FORMING APPARATUS

(75) Inventors: Kenichi Komiya; Koji Tanimoto, both of Kanagawa-ken; Naoaki Ide, Shizuoka-ken; Jun Sakakibara, Tokyo, all of (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,343

(22) Filed: Aug. 8, 2001

Related U.S. Application Data

(62) Division of application No. 09/541,886, filed on Mar. 31, 2000, now Pat. No. 6,297,839.

(30) Foreign Application Priority Data

Apr. 1, 1999 (JP) ............................................. 11-094983

(51) Int. Cl.$^7$ ................................................ G03G 15/04
(52) U.S. Cl. ....................... 347/133; 347/234; 347/236; 347/246; 347/248
(58) Field of Search .................................. 347/129, 133, 347/233, 234, 235, 236, 246, 248, 250; 359/204

(56) References Cited

U.S. PATENT DOCUMENTS

| 5,264,871 A | * | 11/1993 | Tsukada et al. | ......... 347/131 X |
| 5,750,986 A | | 5/1998 | Genovese | ................... 250/235 |
| 5,892,533 A | * | 4/1999 | Tanimoto et al. | ........... 347/257 |
| 6,208,370 B1 | * | 3/2001 | Hoeft | ......................... 347/250 |
| 6,285,389 B1 | * | 9/2001 | Genovase | ................... 347/250 |

FOREIGN PATENT DOCUMENTS

| JP | 6-222299 | 8/1994 |
| JP | 7-218854 | 8/1995 |
| JP | 10-142535 | 5/1998 |

* cited by examiner

*Primary Examiner*—Joan Pendegrass
(74) *Attorney, Agent, or Firm*—Foley & Lardner

(57) ABSTRACT

A light beam scanner unit includes a light beam generating unit for generating light beams at a fixed power, a polygon mirror for reflecting light beams generated from the light beam generating means toward a surface to be scanned, thereby scanning it, and a light beam power sensing unit for sensing light beam power for scanning a surface to be scanned with the polygon mirror. This light beam scanner unit further has a mirror contamination sensing unit for sensing contamination of the polygon mirror by comparing a sensing result obtained from the light beam power sensing unit when light beams are emitted by the light beam generating unit with a preset reference value.

6 Claims, 19 Drawing Sheets

LIGHT BEAM SCANNER UNIT WITH PASSING POSITION AND POWER CONTROL AND IMAGE FORMING APPARATUS

This is a Divisional Application of application Ser. No. 09/541,886, filed Mar. 31, 2000 now U.S. Pat. No. 6,297,839.

BACKGROUND OF THE INVENTION

1. Field of the Invention

The present invention relates to a light beam scanner unit for forming a single electrostatic latent image on a single photosensitive drum by scanning the photosensitive drum with plural laser light beams simultaneously, and an image forming apparatus using this light beam scanner unit such as, for instance, digital copying machines, laser printers, etc.

2. Description of the Related Art

In recent years various kinds of digital copying machines have been developed for forming images through scanning and exposing with laser beams and electro-photographic process.

Recently, in order to achieve high speed image formation, a digital copying machine has been developed.

This digital copying machine employs a multi-beam system, that is, a number of laser beams are generated and plural lines are scanned simultaneously with these plural laser beams.

This multi-beam system digital coping machine is equipped with an optical system unit, which is a light beam scanner unit, comprising mainly plural semiconductor laser oscillators for generating laser beams, a rotary polyhedral mirror such as polygon mirror, which reflects laser beams that are output from these plural laser oscillators toward a photosensitive drum and scans the photosensitive drum with the laser beams, a collimator lens and f-θ lens.

Further, in order to obtain an image of the high quality using the multi-beam optical system, the light beam powers are normally controlled so as to make them equal on the photosensitive drum.

In this light beam power control, light beams that are led onto a photosensitive drum by a polygon mirror are sensed with a light sensor element and converted into current corresponding to quantity of light, the current that is output from this light sensor element is converted into voltage in a current-voltage converter, the voltage output from this current-voltage converter is integrated in an integrator, the output of this integrator is converted into a digital signal by an A/D converter and power sensor information is obtained, and laser oscillators are controlled according to this power sensor information so that light beam powers for scanning the photosensitive drum become a fixed value.

Further, in a digital copying machine of multi-beam system, a light beam passing position in the sub-scanning direction is controlled in order to form an image of high quality.

In this light beam passing position control, the passing position of light beams led on a photosensitive drum by a polygon mirror in a direction orthogonal to the scanning direction of the light beams is sensed with a light bean sensor element, an optical path deflection volume to deflect the light beam passing position to a desired position on a photosensitive drum is calculated based on this sensing result and based on this calculated optical path deflection volume, an optical path deflection means such as galvanomirrors, etc. are controlled and thus, the deflection of the light beam passing position on a photosensitive drum is controlled.

However, in a conventional light beam power control, such a problem was caused as shown below.

That is, the polygon mirror is normally rotating at a high speed of about 20,000 [rpm] and the surface of the polygon mirror is contaminated by dust in the air and silicone generated from a fixing unit in an image forming apparatus in many cases.

In particular, the contamination of the edge portion at the top of the rotating direction of the mirror is remarkable.

FIG. 19 shows the state of contamination on the mirror surface. Reference numerals 35 and Q show the contamination on the polygon mirror and the mirror surface, respectively. The area near this edge portion is a portion where light beams are reflected when passing over a light beam power sensor element, and the contamination Q of this portion largely affects the light beam sensor characteristic.

That is, for instance, when the area near the central portion of the light receiving surface of light beam power sensing element is scanned with light beams by the polygon mirror, the light beams are partially reflected irregularly on the polygon mirror due to the contamination of the polygon mirror surface, changing the light beam.

When this light beams are focussed on the light receiving surface of the light beam power sensing element, quantity of light beams becomes less than that when the mirror surface is not contaminated (quantity of light reaching the light receiving surface decreases).

In this case, because the output of the light beam power sensing element becomes sharply smaller than at the normal state, a light emitting power indicating value to laser oscillators is increased so that the output of the light sensing element becomes a fixed value. Thus, on the light receiving surface of the light beam power sensing element, laser power at the normal state is obtained even when the polygon mirror surface is contaminated. However, as the polygon mirror surface for forming an image is not contaminated, an image forming unit forms an image with a light beam power larger than that at the normal state. As a result, collapsed portions are caused on an output image and the quality of image becomes worse.

Further, the contamination on the polygon mirror surface expands up to the central portion of the polygon mirror with the lapse of time. In this case, the light beam shape changes on the image forming unit and the quality of image is deteriorated.

Further, when the polygon mirror surface is contaminated remarkably, quantity of light minimum required for the light beam power sensing element as well as the light beam passing position sensing element to operate cannot be secured and it is considered that even the light beam passing position control cannot be made. In this case, as a matter of course, the quality of image becomes worse.

SUMMARY OF THE INVENTION

It is an object of the present invention to provide a light beam scanner unit and an image forming apparatus capable of preventing deterioration of the quality of image due to contamination of a rotary polygon mirror and minimizing interruption of an image forming operation resulting from contamination of the rotary polygon mirror.

Further, another object of the present invention is to provide a light beam scanner unit and an image forming apparatus capable of the proper light beam passing position sensing, light beam power sensing and performing the image formation of images of high quality.

According to the present invention, a light beam scanner unit is provided. This light beam scanner unit comprises light beam generating means for generating light beams at a fixed power; a polygon mirror for reflecting the light beams generated from the light beam generating means toward a surface to be scanned and for scanning the surface with the light beams; a light beam power sensing means to sense the light beam power for scanning a surface to be scanned with the polygon mirror; and a mirror contamination sensing means for sensing contamination of the polygon mirror by comparing a sensing result obtained from the light beam power sensing means when light beams are emitted by the light beam generating means with a preset reference value.

Further, according to the present invention, an image forming apparatus is provided for forming an image on an image carrier by scanning and exposing the image carrier with light beams. This image forming apparatus comprises: light beam generating means initially pre-adjusted by an initial value so as to generate light beams at a desired power; scanning means for scanning the image carrier with the light beams by reflecting the light beams generated from the light beam generating means toward the image carrier; light beam position sensing means for sensing the passing position of light beams in a direction orthogonal to the scanning direction of the light beam for scanning the image carrier by the scanning means; light beam passing position control means for controlling the passing position of the light beams scanned by the scanning means on the image carrier based on the sensing result of the light beam position sensing means; light beam power sensing means for sensing light beam power for scanning the image carrier by the scanning means; first light beam power control means for controlling the light beam generating means based on the sensing result of the light beam power sensing means so that the light beam power scanning the image carrier becomes a fixed value; and second light beam power control means for controlling the light beam generating means based on the initial value at time of image forming so that the light beam scanning the image carrier becomes a fixed value.

DETAILED DESCRIPTION OF THE PREFERRED EMBODIMENTS

Preferred embodiments of the present invention will be described below referring to the attached drawings.

Figure 1:
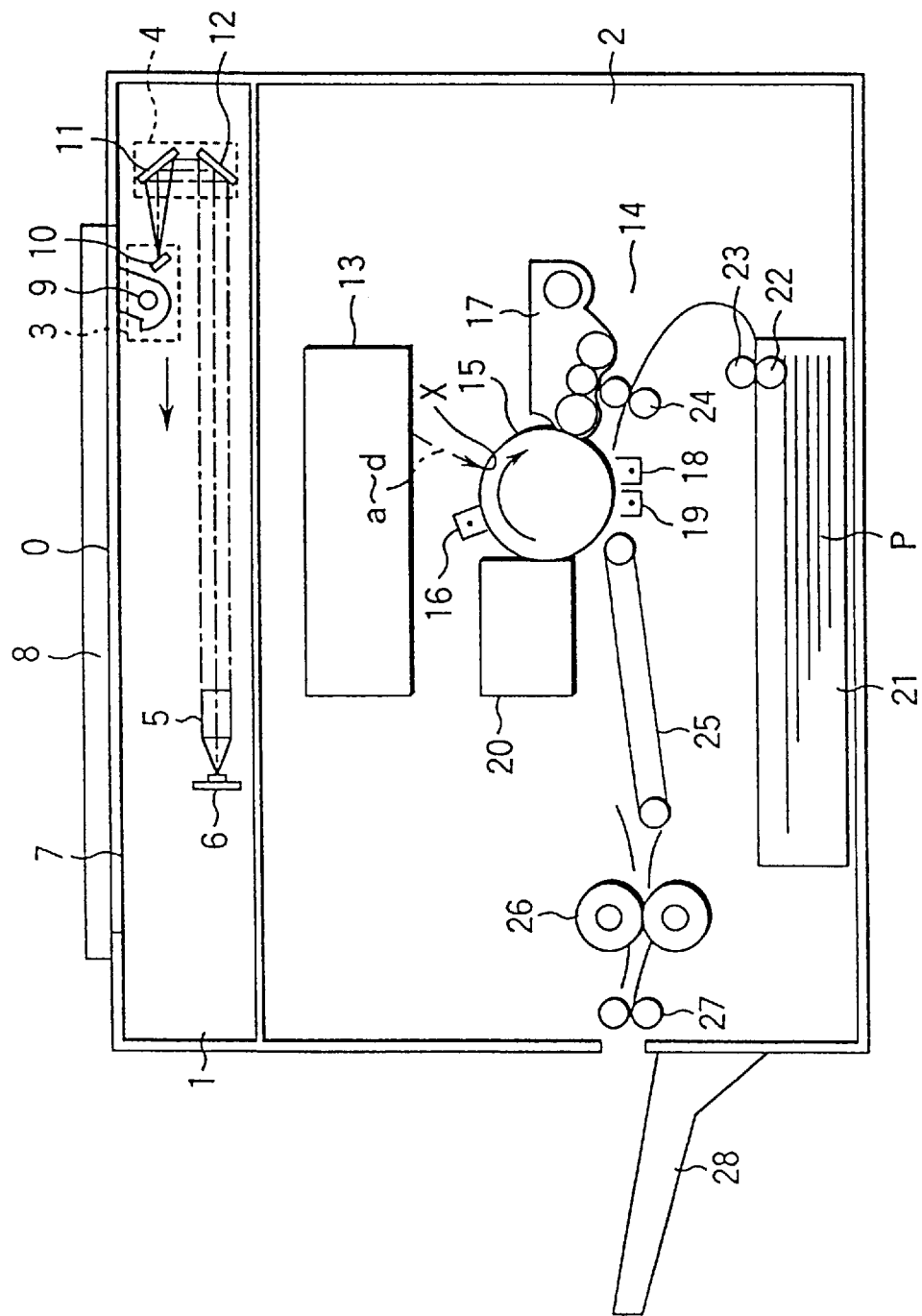
FIG. 1 is a schematic diagram showing a structure of a digital machine in the embodiments of the present invention.

FIG. 1 shows the structure of a digital copying machine as an image forming apparatus to which a light beam scanner of the present invention is applicable. That is, this digital copying machine comprises, for instance, a scanner unit 1 as image reading means and a printer unit 2 as image forming means. The scanner 1 comprises a first carriage 3 that is movable in the arrow direction shown, a second carriage 4, an image formation lens 5, and a photoelectric conversion element 6.

In FIG. 1, a document O is put on a document table 7 with the reverse side up. The front right side in the crosswise direction on the document table 7 is the center reference for placing a document O. A document O is pressed down on the document table 7 by a document holding cover 8 that can be opened/closed.

The document O is illuminated by a light source 9 and its reflected light is focussed on the light receiving surface of the photoelectric conversion element 6 via mirrors 10, 11 and 12, and the image formation lens 5. Here, the first carriage 3 equipped with the light source 9 and the mirror 10 and the second carriage 4 equipped with the mirrors 11 and 12 move at a relative velocity of 2:1 so as to make the optical path length uniform. The first carriage 3 and the second carriage 4 are moved from the right to the left direction in synchronism with a read timing signal by a carriage driving motor (not shown).

Thus, an image on the document O placed on the document table 7 is read sequentially for every line by the scanner unit 1 and the read outputs are converted into 8-bit digital image signals showing density of the images in an image processing unit (not shown).

The printer unit 2 comprises an optical system unit 13 and an image forming unit 14 combined with an electro-photographing system that is capable of forming images on a paper P that is an image receiving medium. That is, the image signals read from the document O by the scanner unit 1 are processed in an image processing unit (not shown) and then, are converted into laser light beam (hereinafter, simply referred to as light beam) from semiconductor laser oscillators. In this embodiment, a multi-beam optical system using plural semiconductor laser oscillators (more than two units) is adopted The detailed structure of the optical system unit 13 will be explained later. Plural semiconductor laser oscillators provided in this unit emit light according to a laser modulation signal that is output from the image processing unit (not shown) and plural light beams output therefrom are reflected on a polygon mirror and turned to scanning beams and output to the outside of the unit.

Plural light beams that are output from the optical system unit 13 are formed to an image as a spot scanning beam having a required resolution at the point of the exposure position X on a photosensitive drum 15 that is an image carrier. This image is then exposed and an electrostatic latent image corresponding to image signals is formed on the photosensitive drum 15.

Around the photosensitive drum 15, an electrifying charger 16 for charging its surface, a developing unit 17, a transfer charger 18, a peeling charger 19, and a cleaner 20 are disposed. The photosensitive drum 15 is turned and driven at a fixed peripheral speed by a driving motor (not shown) and is charged by the electrifying charger that is provided opposite to its surface. Plural light beams (scanning light) are spotted to form an image at the exposing position X of on the charged photosensitive drum 15.

A electrostatic latent image formed on the photosensitive drum 15 is developed with a toner (a developer) supplied from the developing unit 17. A toner image formed on the photosensitive drum 15 is transferred by the transfer charger 18 on a paper P that is timely supplied by a paper feed system at a transferring position.

The paper feed system feeds paper P in a paper feed cassette 21 provided at the bottom by separating one sheet at a time by a supply roller 22 and a separation roller 23. The paper is transported to a register roller 24 and fed to a transferring position at a specified timing. At the downstream side of the transfer charger 18, a paper transport mechanism 25, a fixing unit 26 and an exit roller 27 to exit an image formed paper P are provided. The toner image transferred on a paper P is fixed by the fixing unit 26 and thereafter, discharged on a receiving tray 28 at the outside via the exit roller 27.

Further, after completing the transfer of image on a paper P, the photosensitive drum 15 is cleaned to the initial state by removing residual toner left on the surface by the cleaner 20 and becomes in the standby state for next image formation.

By repeating the process operation shown above, the image forming operation is consecutively carried out.

As explained above, the document O placed on the document table 7 is read by the scanner unit 1, and after applied with a series of processes in the printer unit 2, the read information is recorded on a paper P as a toner image.

Next, the optical system unit 13 will be explained.

Figure 2:
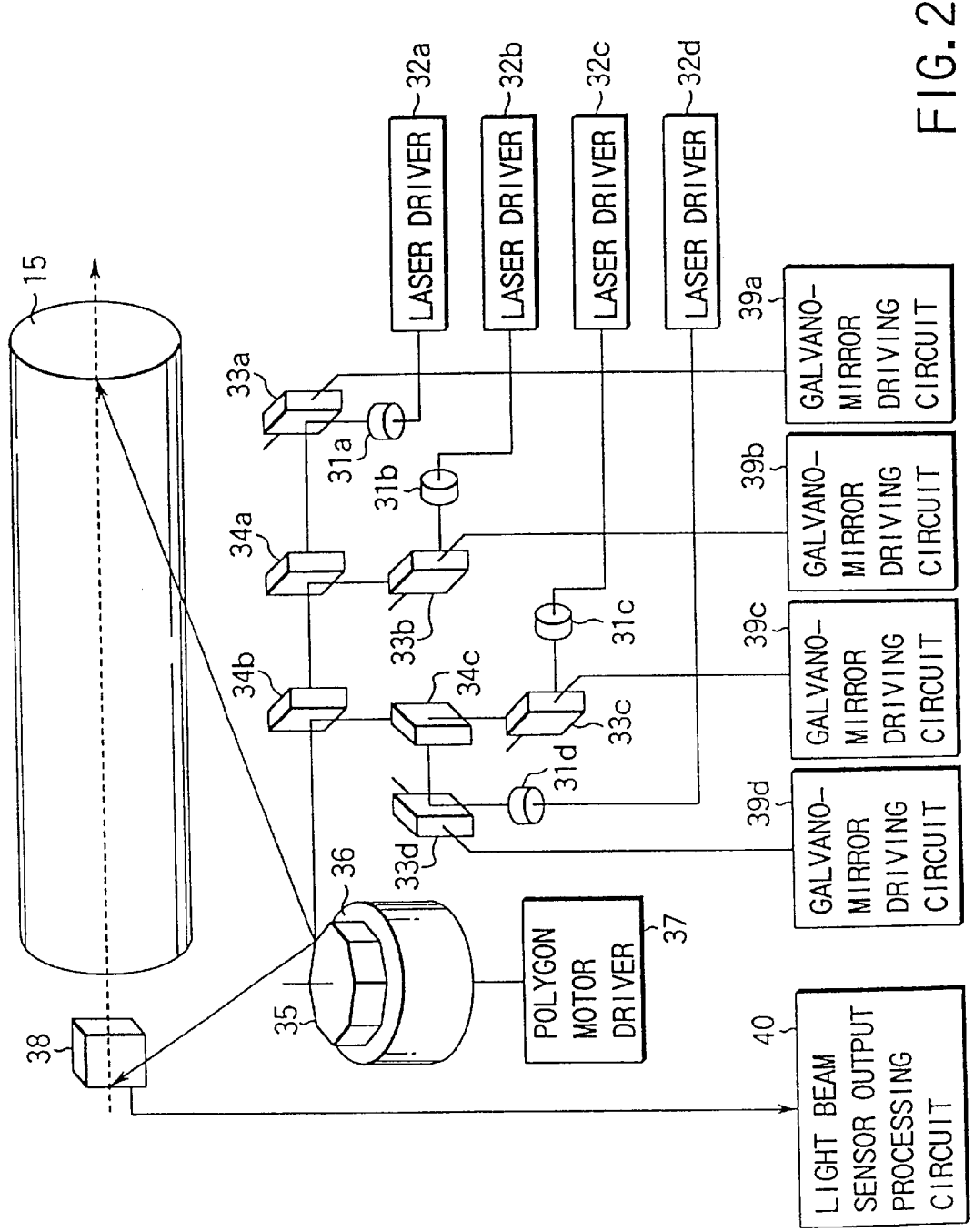
FIG. 2 is a diagram showing a structure of optical system unit and the positional relation of a photosensitive drum.

FIG. 2 shows a structure of the optical system unit 13 and the positional relation with the photosensitive drum 15. The optical system unit 13 has built in, for instance, semiconductor laser oscillators 31a, 31b, 31c and 31d as four light beam generating means. As images are formed for every scanning line simultaneously by these semiconductor laser oscillators 31a–31d, it becomes possible to form images at a high speed without increasing the number of revolutions of the polygon mirror extremely.

That is, the laser oscillator 31a is driven by a laser driver 32a and the output light beam is applied upon to a galvanomirror 33a that is optical path changing means after passing a collimator lens (not shown). The light beam that is reflected on the galvanomirror 33a is applied to a polygon mirror 35 that is a rotary multi-plane mirror after passing half mirrors 34a and 34b.

The polygon mirror 35 is rotated at a constant speed by a polygon motor 36 that is driven by a polygon motor driver 37. The reflected beams from the polygon mirror 35 scans in a fixed direction at an angular speed that is decided by the number of revolutions of the polygon mirror 36. The light beam scanned by the polygon mirror 35 passes an f-θ lens (not shown) by its f-θ characteristic scans a light receiving surface of a light beam sensor unit 38 that functions as light beam position sensing means, light beam passing timing sensing means and light beam power sensing means, and the surface of the photosensitive drum 15 at a constant speed.

The laser oscillator 31b is driven with a laser driver 32b and the output light beam is reflected on a galvanomirror 33b after passing a collimator lens (not shown) and is further reflected on a half mirror 34a. The reflected light from the half mirror 34a passes the half mirror 34b and applied to the polygon mirror 35. The route after the polygon mirror 35 is the same as that of the laser oscillator 31a shown above and it passes the f-θ lens and scans the light receiving surface of the light beam sensor unit 38 and the surface of the photosensitive drum 15 at a constant speed.

The laser oscillator 31c is driven with a laser driver 32c and the output light beam is reflected on a galvanomirror 33c after passing the collimator lens (not shown). This light beam further passes a half mirror 34c, is reflected on the half mirror 34b and applied to the polygon mirror 35. The route after the polygon mirror 35 is the same as the laser oscillators 31a, 31b shown above and passes the f-θ lens (not shown) and scans the light receiving surface of the light beam sensor unit 38 and the photosensitive drum 15 at a constant speed.

The laser oscillator 31d is driven with a laser driver 32d and the output light beam is reflected on a galvanomirror 33d after passing the collimator lens (not shown). This light beam is further reflected on the half mirrors 34c and again reflected on the half mirror 34b and is applied to the polygon mirror 35. The route after the polygon mirror 35 is the same as the laser oscillators 31a, 31b and 31c, and the light beam passes the f-θ lens (not shown) and scans the light receiving surface of the light beam sensor unit 38 and the photosensitive drum 15 at a constant speed.

Further, the laser drivers 32a–32d have a built-in automatic power control circuit (APC), respectively and have the laser oscillators 31a–31d constantly operate to emit light at a luminous power level which is set by a main control unit (CPU) 51 that will be explained later.

Light beams output from separate laser oscillators 31a, 31b, 31c and 31d are compounded on the half mirrors 34a, 34b, 34c and four light beams are directed in the direction of the polygon mirror 35.

Accordingly, four light beams are able to simultaneously scan the photoelectric drum 15 and when the number of revolutions of the polygon mirror 35 are the same as in a conventional single beam, it becomes possible to record images at four times of speed.

The galvanomirrors 33a, 33b, 33c and 33d are provided for adjusting (controlling) the positional relation between light beams in he sub-scanning direction and galvanomirror driving circuits 39a, 39b, 39c and 39d are connected to respective galvanomirrors for driving them.

The light beam sensor unit 38 is for sensing the four light beam passing positions, passing timings and power, respectively and is disposed near the end of the photoelectric drum 15 so that its light receiving surface becomes an equal level to the surface of the photoelectric drum 15. The galvanomirrors 33a, 33b, 33c and 33d corresponding to respective light beams (the image forming position in the sub-scanning direction), the light emission power (intensity) of the laser oscillators 31a, 31b, 31c and 31d, and the light emission timing (the image forming position in the main scanning direction) are controlled according to the sensor signals from the light beam sensor unit 38. In order to generate signals for performing these controls, a light beam sensor output processing circuit 40 is connected to the light beam sensor unit 38.

Next, the light beam sensor unit 38 will be explained.

Figure 3:
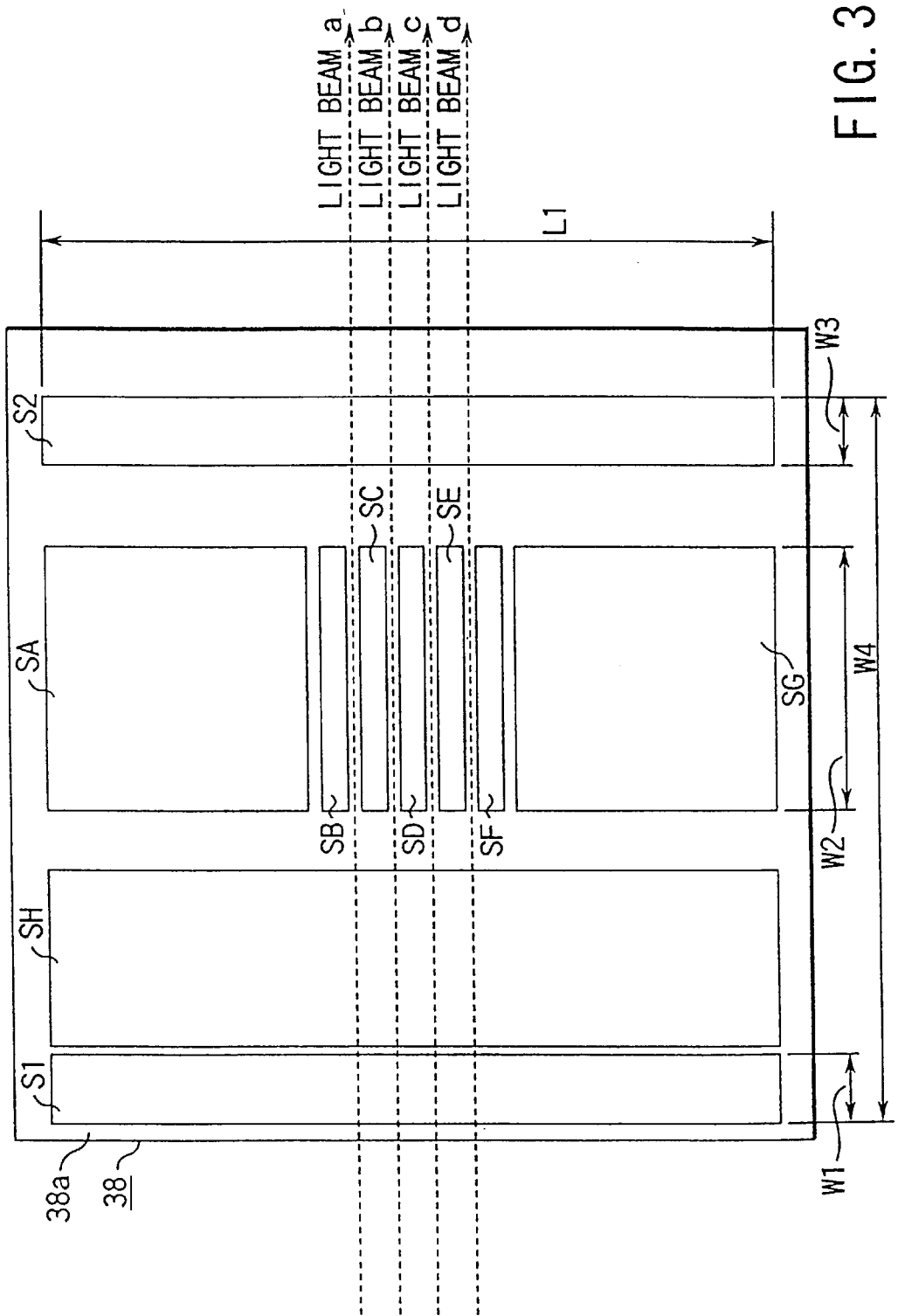
FIG. 3 is a block diagram schematically showing a structure of a light beam sensor unit.

FIG. 3 schematically shows the relation of the structure of the light beam sensor unit 38 with the light beam scanning direction. Light beams a–d from four semiconductor laser oscillators 31a, 31b, 31c and 31d are scanned when the polygon mirror 35 rotates from the left to the right and cross above the light beam sensor unit 38.

The light beam sensor unit 38 comprises two longitudinal sensor patterns S1 and S2 as a first light sensor element, seven sensor patterns SA, SB, SC, SD, SE, SF and SG as second and third light sensor elements disposed as being put between these two sensor patterns S1 and S2, and a holding substrate 38a to hold these sensor patterns S1, S2, SA, SB, SC, SD, SE, SF and SG in one united body. Further, the sensor patterns S1, S2 and SA–SG are composed of, for instance, photo diodes.

Here, the sensor pattern S1 senses a light beam passing timing and generates a reset signal (an integral operation starting signal) of a integrator, which is described later, and the sensor pattern S2 generates a conversion starting signal of an A/D converter, which will be described later, similarly by sensing the light beam passing timing. Further, the sensor patterns SA–SG sense the light beam passing positions.

The sensor patterns S1 and S2 are formed long in the direction orthogonal to the light beam scanning direction so that light beams a–d that are scanned by the polygon mirror 35 always cross them regardless of the positions of the galvanomirrors 33a–33d as shown in FIG. 3. In this embodiment, for instance, the widths W1 and W3 of light beams in the scanning direction are 200 μm and the lengths L orthogonal to the scanning direction of light beams is 2000 μm.

The sensor patterns SA–SG are disposed so as to superpose on the direction orthogonal to the light beam scanning direction between the sensor patterns S1 and S2 as shown in FIG. 3 and the lengths are the same as the length L1 of the sensor patterns S1 and S2. Further, the width W2 in the light beam scanning direction of the sensor patterns SA–SG is, for instance, 600 μm.

Further, in order to sense the light beam power applied on the photosensitive drum 15, for instance, the light beam passing position is controlled so as to pass over the sensor pattern SA or SG and take in the output from the sensor pattern SA or SG as shown by the broken arrow P1 or P2 in FIG. 3.

Further, the shapes of the sensor patterns SB–SF are, for instance, a rectangular of 32.3 μm×600 μm and a very small gap G of about 10 μm is formed in the direction orthogonal to the light beam scanning direction. Accordingly, the disposition pitch between the gaps is about 42.3 μm. Further, the sensor patterns SA and SB, and SF and SG are disposed so that the gap between them becomes about 10 μm, respectively. The width between the direction orthogonal to the light beam scanning direction of the sensor patterns SA, SG is made larger than the width of the sensor patterns SB–DF.

The detailed control using the output of the light beam sensor unit 38 composed as shown above is omitted. The gap formed in 42.3 μm pitch becomes a target for controlling the passing position of the light beams a, b, c and d at an interval of a specified pitch (42.3 μm in this embodiment). That is, the targets of respective passing positions for the light beams are the gap G (B–C) formed by the sensor patterns SB AND SC for the light beam a, the gap G (C–D) formed by the sensor patterns SC and SD for the light beam b, the gap G (D–D) formed by the sensor patterns SD and SE for the light beam c, and the gap G (E–F formed by the sensor patterns SE and SF for the light beam d.

Next, the control system will be explained.

Figure 4:
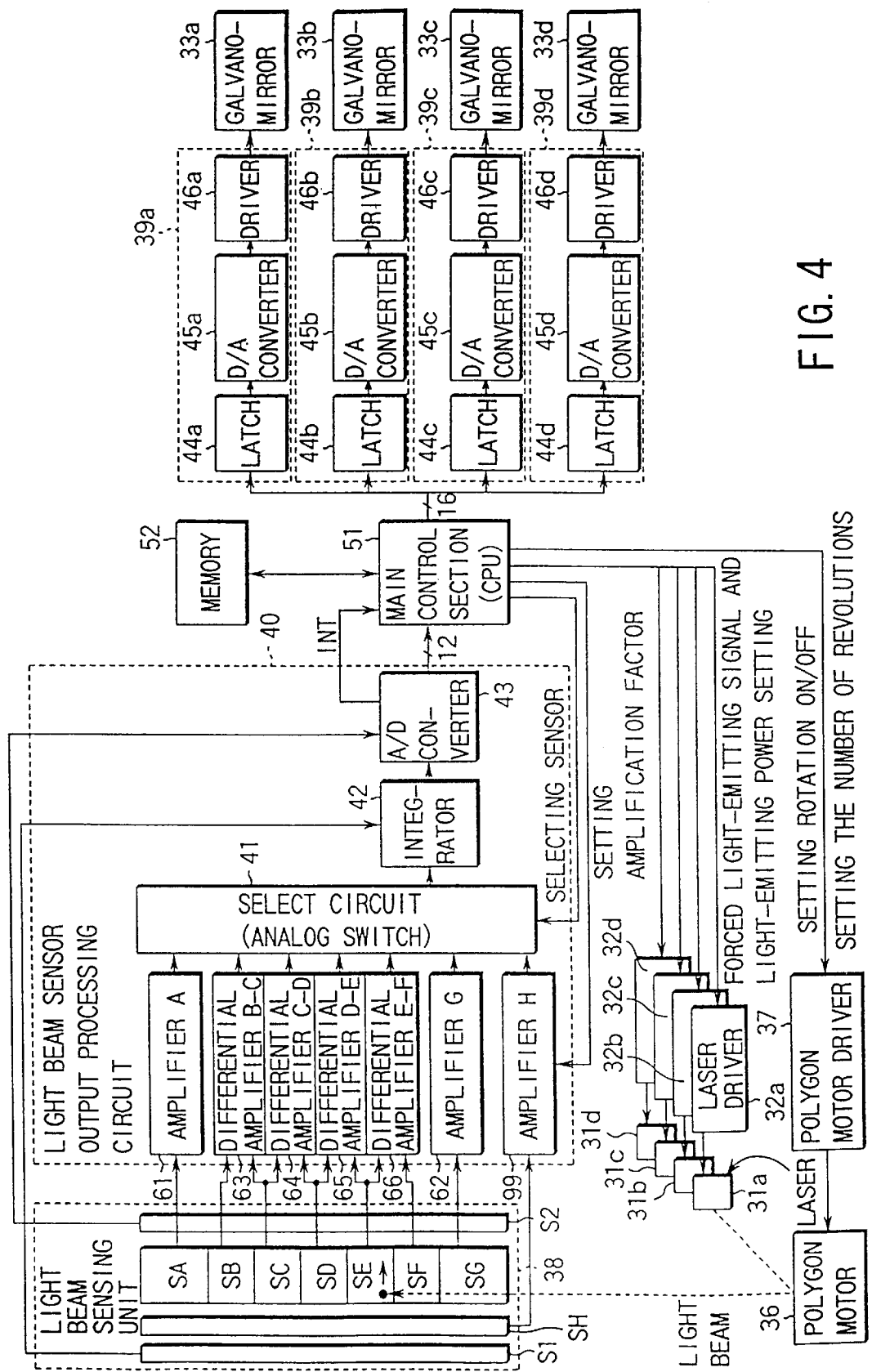
FIG. 4 is a block diagram showing a control system for mainly controlling multi-beam optical system.

FIG. 4 shows a control system for controlling mainly a multi-beam optical system. That is, 51 is a main control unit to govern the overall control, comprising, for instance, a CPU, and a memory 52, laser drivers 32a, 32b, 32c and 32d, a polygon moor driver 37, galvanomirror driving circuits 39a, 39b, 39c and 39d, and a light beam sensor output processing circuit 40 are connected thereto.

As explained previously, from the sensor patterns S1 and S2 of the light beam sensor unit 38, pulse shape signals showing that the light beams passed are output. Further, from plural sensor patterns SA–SG, independent signal is output corresponding to the light beam passing position.

The output signals from the sensor patterns SA and SG out of these sensor patterns SA–SG are input to amplifiers 61 and 62 (hereinafter, may be referred to as the amplifiers A and G), respectively. Further, amplification factors of the amplifiers 61 and 62 are set by the main control unit 51 that is composed of a CPU.

Further, as explained above, the light beam passing position is set at the sensor pattern SA or SG by controlling the galvanomirrors 33a–33d and relative light beam power on the photosensitive drum 15 is sensed by monitoring the output of the sensor pattern SA or SG.

Further, output signals from the sensor patterns SB–SF out of the sensor patterns SA–SG are input to differential amplifiers 63–66 (hereinafter, may be referred to as differential amplifiers B–C, C–D, D–E and E–F) which amplifies a difference in adjacent output signals of the sensor patterns SB–SF, respectively. Here, the differential amplifier 63 amplifies a difference between the output signals from the sensor patterns SB and SC, the differential amplifier 64 amplifies a difference between the output signals from the sensor patterns SC and SD, the differential amplifier 65 amplifies a difference between the outputs from the sensor patterns SD and SE, and the differential amplifier 66 amplifies a difference between the output signals from the sensor patterns SD and SF.

The outputs from the amplifiers 61–66 are input to a select circuit (an analog switch) 41, respectively. The select circuit 41 selects a signal to be input to an integrator 42 according to a sensor select signal from the main control unit (CPU) 51. The output signal of the amplifier selected by the select circuit 41 is input to the integrator 42 and integrated there.

On the other hand, a pulse shape signal that is output from the sensor pattern S1 is digitized in a digitizing circuit 53, which is the digitizing means, and is then input to the main control unit 51. This signal from the sensor pattern S1 is used as a reset signal (an integrating operation starting signal) to reset the integrator 42 and at the same time, to start a new integrating operation. Further, the role of the integrator 42 is to remove noise and remove the influence of mounting tilt of the light beam sensor unit 38.

The digitizing circuit 53 is to digitize an input signal with a variable threshold value and this threshold value is changed and controlled under the control of the main control unit 51 as described later.

The output of the integrator 42 is input to an A/D converter 43. Further, the pulse shape signal that is output from the sensor pattern S2 is digitized in the digitizing circuit 53 and then, input to the A/D converter 43 and the main control unit 51. The A/D conversion operation of the A/D converter 43 is started when a signal from the sensor pattern S2 is applied as a conversion start signal. That is, the A/D conversion is started at the timing when the light beams pass the sensor pattern S2.

Thus, the integrator 42 is reset immediately before the light beams passes the sensor patterns SA–SG according to the pulse signal from the sensor pattern S1 and at the same time, the integrate operation is started, and while the light beams are passing over the sensor patterns SA–SG, the integrator 42 integrates signals showing the light beam passing positions.

Immediately after the light beams passed over the sensor patterns SA–SG, the integrated result by the integrator 42 is A/D converted by the A/D converter 43 as triggered by the pulse signal from the sensor pattern S2. Thus, the sensing signal of the light beam passing position with less noise and the mounting tilt effect of the light beam sensor unit 38 removed can be converted into the digital signal.

Further, after completing the A/D conversion, the A/D converter 43 outputs an interrupt signal INT showing the completion of the process to the main control unit 51.

Here, the amplifiers 61–66, the select circuit 41, the integrator 42, the A/D converter 43 and the digitizing circuit 53 comprise the light beam sensor output processing circuit 40.

Thus, the light beam power sensor signal and light beam position sensor signal from the light beam sensor unit 38, converted into digital signals, are input to the main control unit 51 as the relative light beam power information or the light beam position information on the photosensitive drum 15, and light power and light beam passing positions of respective light beams on the photosensitive drum 15 are judged.

Now, according to the relative light beam power sensor signal and the light beam position sensor signal on the photosensitive drum 15 thus obtained, the light emitting power to the laser oscillators 31a–31d is set and the control volumes of the galvanomirrors 33a–33d are calculated in the main control unit 51. These calculation results are stored in a memory 52 as required. The main control unit 51 transmits the calculation results to the laser drivers 32a–32d and the galvanomirror driving circuits 39a–39d.

For retaining the calculation result data, latches 44a–44d are provided to the galvanomirror driving circuits 39a–39d as shown in FIG. 4 and when the main control unit 51 once writes data, the data values are retained until the data are next updated.

The data retained in the latches 44a–44d are converted into analog signals (voltage) in D/A converters 45a–45d and input into drivers 46a–46d for driving the galvanomirrors 33a–33d. The drivers 46a–46d drive and control the galvanomirrors 33a–33d according to the analog signals that are input from the D/A converters 45a–45d.

Further, in this embodiment, only one of the amplified output signals of the sensor patterns SA–SG was selected, integrated and A/D converted and therefore, all of the output signals of the sensor patterns SA–SG cannot be input into the main control unit 51 at one time.

Accordingly, when sensing light beam power, it is necessary to move the light beam passing position on the sensor pattern SA or SG and change the select circuit 41 so that the output signal from the sensor pattern corresponding to the moved light beam passing position is input to the main control unit 51.

Further, in the state where the light beam is passing is not known, it is necessary to judge the light beam passing position by switching the select circuit 41 in order and inputting output signals from all the sensor patterns SA–SG into the main control unit 51.

However, when where the light beam is passing can be once recognized, the light beam passing position can be nearly presumed unless the galvanomirrors 33a–33d are moved extremely and it is not always necessary to input the outputs of all sensor patterns into the main control unit 51.

Figure 5:
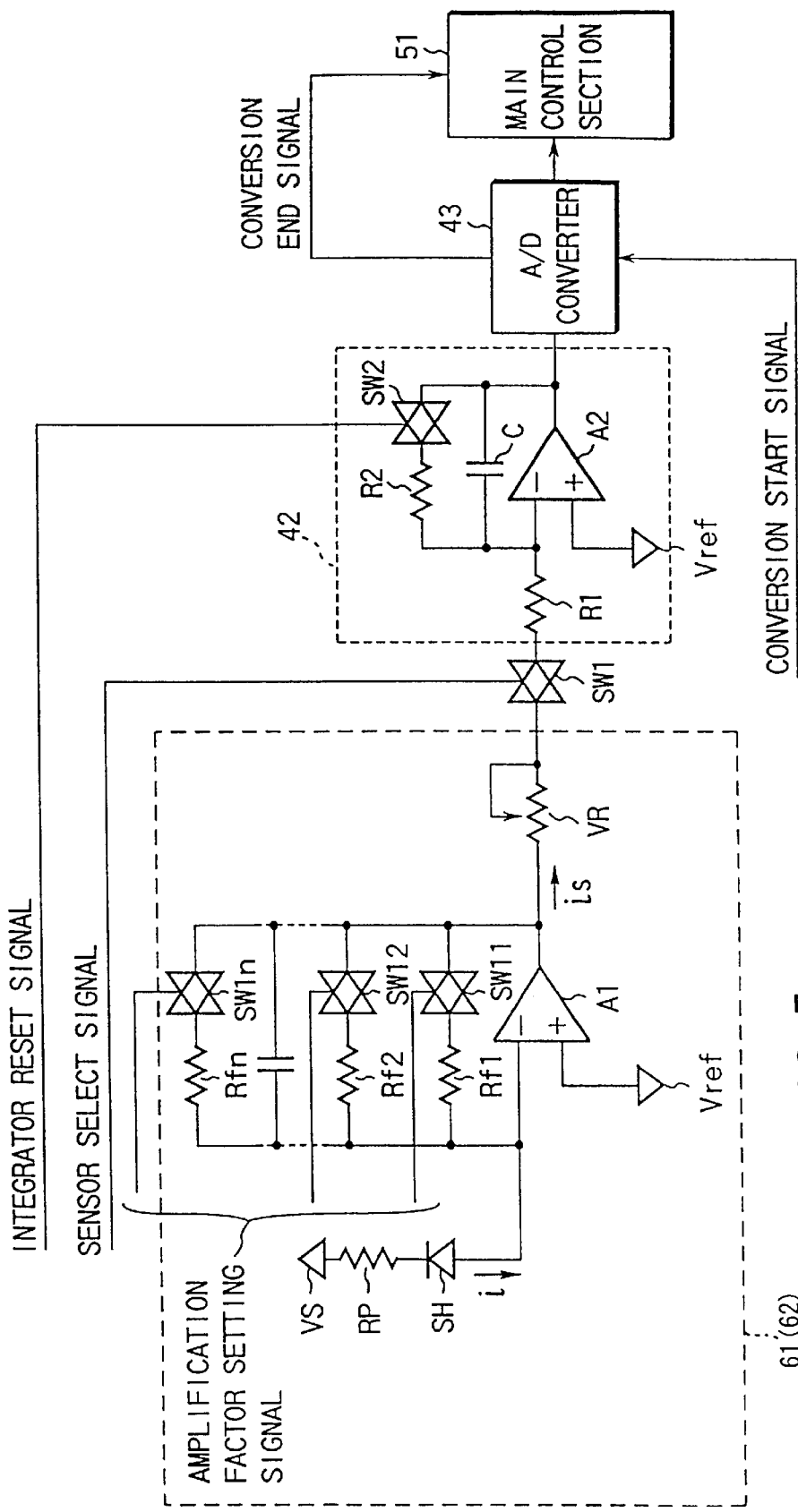
FIG. 5 is a circuit diagram showing an example of the structure of a light beam sensor unit in detail.

FIG. 5 shows an example of the structure of the light beam power sensor unit in the light beam sensor unit output processing circuit 40 in detail. The light beam power sensor unit comprises the amplifier 61 (or 62) that functions as a current-voltage converter, the integrator 42 and the A/D converter 43. However, the integrator 42 and the A/D converter 43 are commonly used with the light beam sensor unit for the sub-scanning direction, and an analog switch SW1 as the select circuit 41 is used by switching according to a purpose.

First, the amplifier 61 (or 62) will be explained. The cathode of the sensor pattern (a photo diode) SA (or SG) for the power sensing is connected to a DC power source VS via a resistor RP and the anode is connected to an inversion input terminal of an operational amplifier Al that is a current/voltage conversion amplifier. Reference voltage Vref is applied to the non-inversion input terminal of the operational amplifier A1.

Between the inversion input terminal and the output terminal of the operational A1, resistors Rf1, Rf2, . . . Rfn are connected in parallel via analogue switches SW11, SW12, . . . SW1n. The analogue switches SW11, SW12, . . . SW1n are turned ON/OFF by an amplification factor setting signal from the main control unit 51. The output terminal of the operational amplifier A1 is connected to one terminal of the analogue switch SW1.

Next, the integrator 42 will be explained. The other terminal of the analogue switch SW1 is connected to the inversion input terminal of the operational amplifier A2 via a resistor R1. Reference voltage Vref is applied to the non-inversion input terminal of the operational amplifier A2. Between the inversion input terminal and the output terminal of the operational switch A2, a capacitor C is connected and a resistor R2 is connected via the analogue switch SW2. The analogue switch SW2 is turned ON/OFF by an integrator reset signal from the digitizing circuit 53.

The output of the operational amplifier A2 is transmitted to the A/D converter 43 and converted into a digital value from an analogue value. The A/D converter 43 executes the A/D conversion according to a conversion start signal from the digitizing circuit 53 and when completing the A/D conversion, transmits a conversion completion signal to the main control unit 51. Upon receipt of the conversion completion signal, the main control unit 51 reads the light beam position information that is converted into a digital value.

Hereinafter, referring to the circuit shown in FIG. 5 and the output waveforms of essential parts shown in FIG. 6, the power sensing operation (and the power sensing control) will be explained.

When performing the power sensing, the amplification factor of the operational amplifier A1 is set by the amplification factor set signal. That is, for instance, when the analogue switch SW11 is selected, the analogue switch SW11 only is closed and the remaining analogue switches SW12–SW1n are opened. Then, the analogue switch SW1 as the select circuit 41 is closed by a sensor select signal and an amplification factor is so set that the output of the operational amplifier A1 is input to the integrator 42.

Thereafter, the scanning position of an objective light beam is moved using a galvanomirror so that it becomes nearly at the center of the sensor pattern SA for the power sensing.

When the light beams passed above the sensor pattern S1, a pulse shape signal is output from the sensor pattern S1 and after digitized in the digitizing circuit 53, the pulse shape signal is input into the analogue switch SW2 as an integrator reset signal and resets the integrator 42 (discharge the electric charge of the integrating capacitor C).

When the light beams passed above the sensor pattern SA, current corresponding to the quantity of light of the light beams is output from the sensor pattern SA. This current is converted into voltage and input to the integrator 42. The integrator 42 integrates the output of the operational amplifier A1 and hold its electric charge.

When the light beams passed above the sensor pattern S2, a pulse shape signal is output from the sensor pattern S2 and after digitized in the digitizing circuit 53, input into the A/D converter 43 as a conversion start signal. The A/D converter 43 converts the output of the integrator 42 analogue to digital and after completing the A/D conversion, outputs a conversion completion signal to the main control unit 51.

Upon receipt of the conversion completion signal, the main control unit 51 reads the output of the A/D converter 43. When the read A/D converted output is smaller than a desired value, the main control unit 51 controls so as to increase the output of a corresponding laser oscillator and when the A/D converted output is larger than a desired value, controls so as to lower the output of the corresponding laser oscillator. This operation is repeated until the A/D converted output becomes a desired value.

Figure 7:
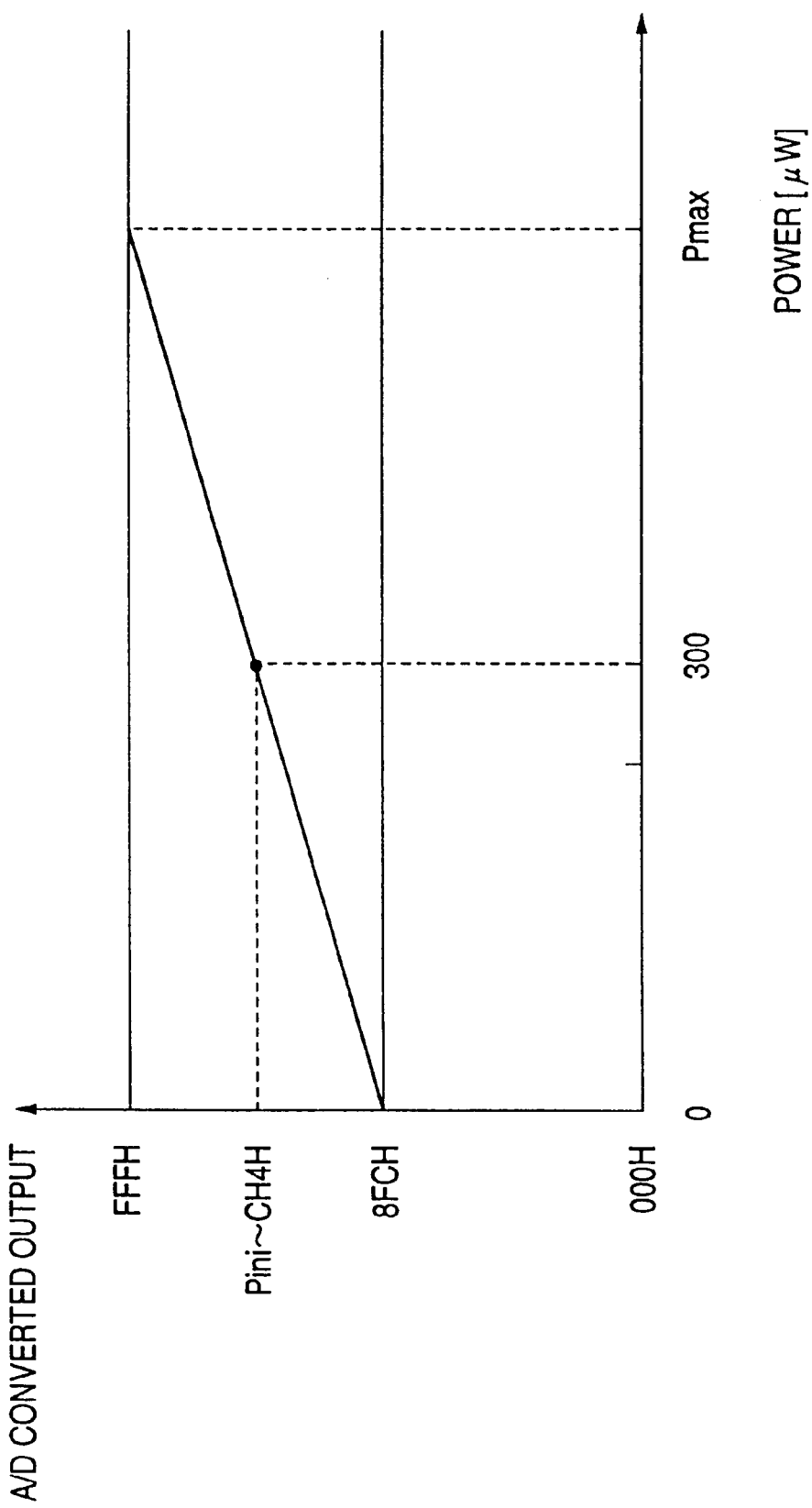
FIG. 7 is a graph showing the power sensing characteristic of a power sensor unit.

A photo diode comprising the sensor pattern SA outputs current that is proportional to the quantity of incident light and therefore, a power sensor characteristic graph shown in FIG. 7 is obtained. In an example shown in this figure, it has a characteristic that the output of the A/D converter 43 becomes FFFH when the power is Pmax.

Figure 8:
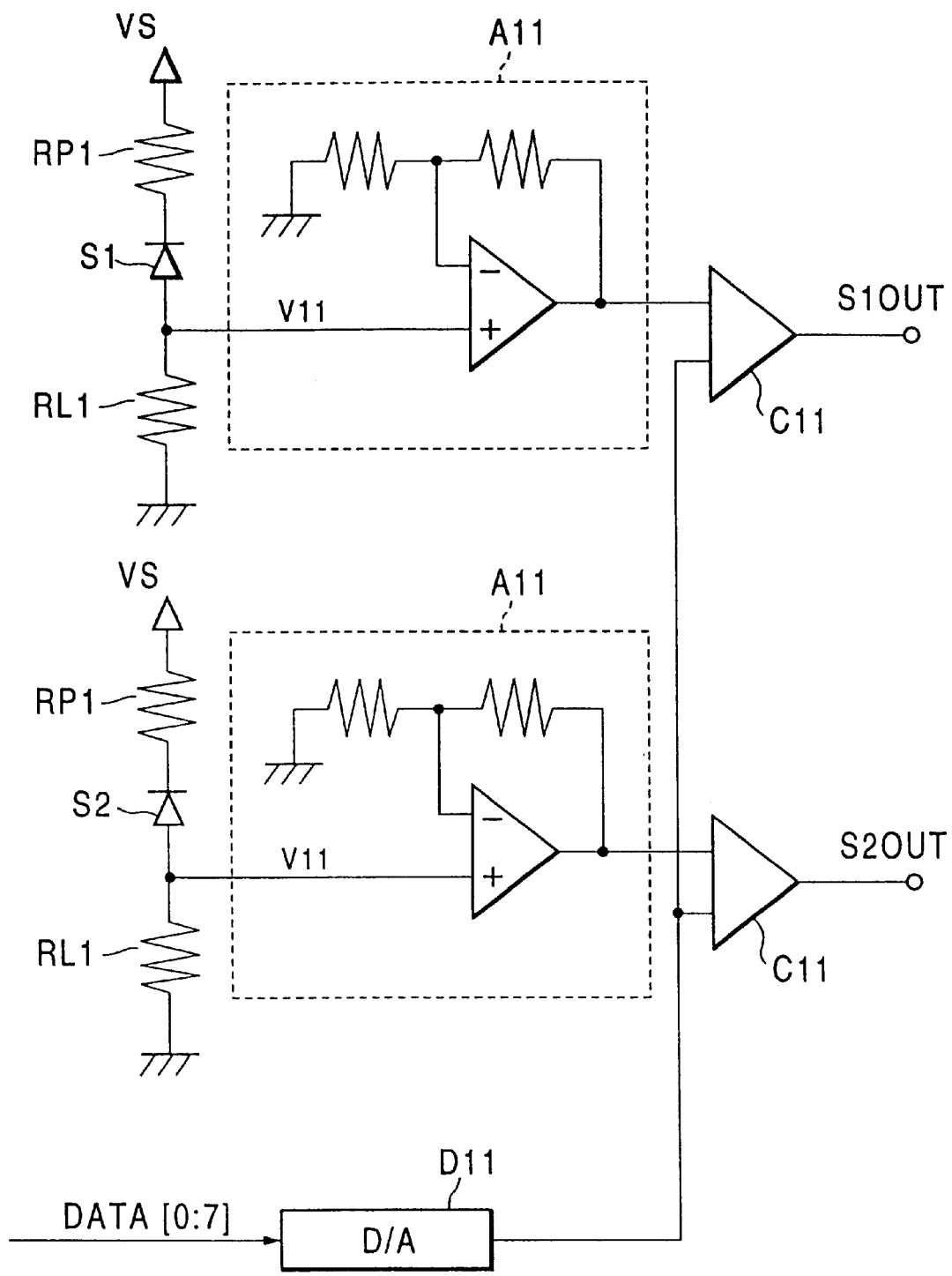
FIG. 8 is a circuit diagram showing an example of the structure of a digitizing circuit.

FIG. 8 shows an example of the structure of the digitizing circuit 53. When the light is applied to the sensor pattern S1, current proportional to the quantity of incident light flows. The current flowing to the sensor pattern S1 is converted into voltage by resistors RP1 and RL1 and becomes voltage V11 (a passing timing sensing output). This voltage V11 is amplified by the non-inversion amplifier A11 and input into a comparator C11. The comparator C11 digitizes an input signal according to a specified threshold value that is set by the D/A converter D11.

The D/A converter D11 sets a threshold value for the comparator C11 by performing the D/A conversion of a threshold value data that is set by the main control unit 51. That is, the main control unit 51 variably controls a threshold value of the comparator C11 by changing a threshold value that is set for the D/A converter D11 corresponding to the power (quantity of light) of light beams as described later in detail. Further, the same also applies to the sensor pattern S2.

In the construction described above, a contamination sensing method of the polygon mirror in the first embodiment of the present invention will be explained.

The first embodiment is to sense the contamination of the mirror surface of the polygon mirror 35 using the sensor pattern SA (or SG) for power sensing. As the power sensing of light beams and the power control have been already explained (for details, refer to, for instance, Japanese Patent Application No. 9-245319), the detailed explanation is omitted and the outline only will be explained here.

First, as an example of the light beam power control, how to control quantity of light beam (power) to 300 [$\mu$W] on the light receiving surface of the sensor pattern SA (equivalent to the surface of the photosensitive drum 15 that is an image forming surface) will be explained.

The main control unit 51 sets a light emitting power indicating value in a D/A converter in the laser driver 32a so as to have the laser oscillator 31a emit light at a fixed power by rotating the polygon motor 36. Normally, the light emitting power of the laser drivers 32a–32d to the light emitting power indication value from the main control unit 51 has been roughly adjusted.

Figure 9:
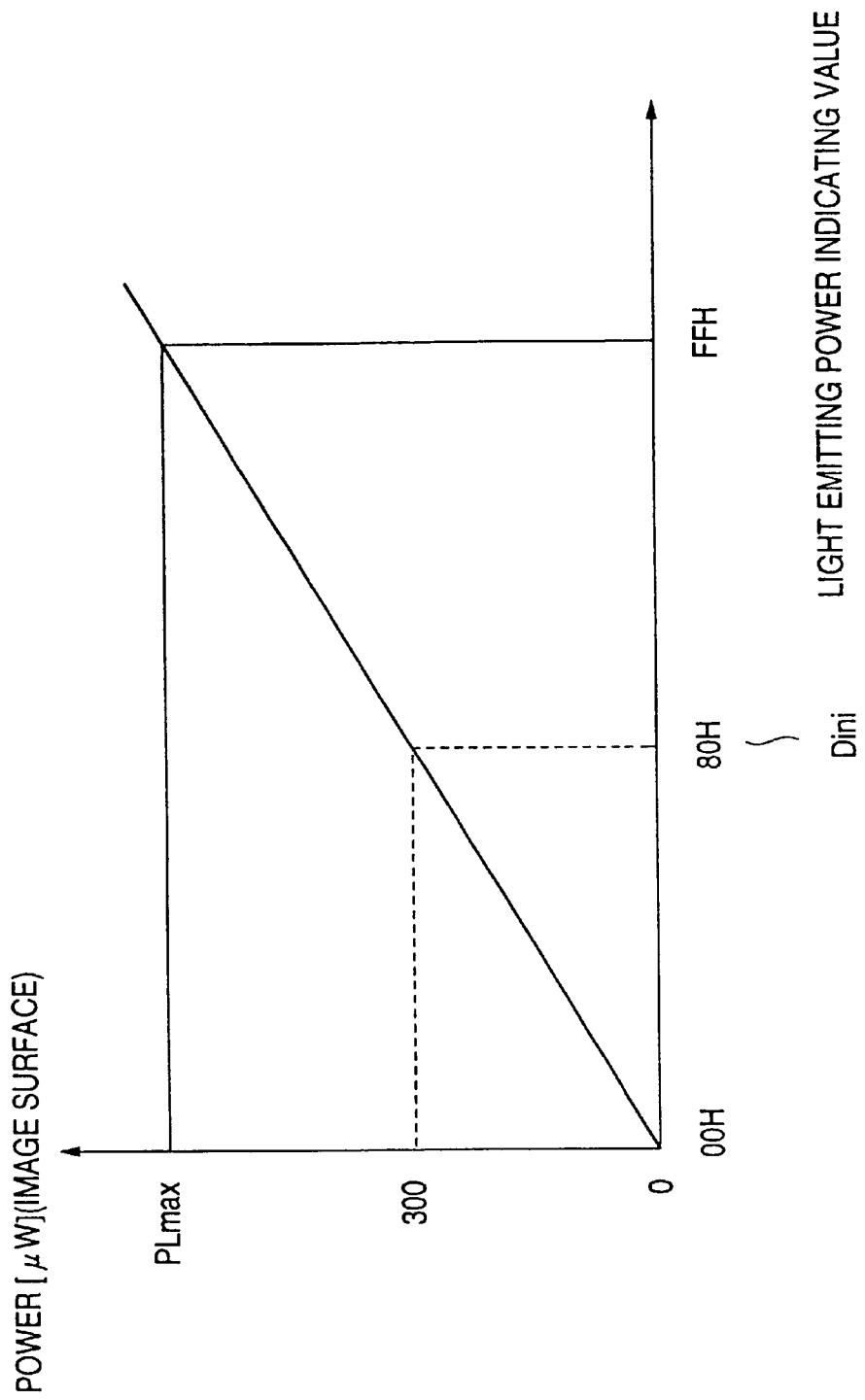
FIG. 9 is a graph showing the output characteristic of a laser oscillator.

In this case, the light emitting power is adjusted to 300±15 [$\mu$W] to a light emitting power indicating value 80H (hexadecimal) from the main control unit 51 using an 8-bit D/A converter. In this case, therefore, in order to have the laser oscillator 31a emit light at about 300 [$\mu$W], the main control unit 51 sets an indicating value 80H in the D/A converter in the laser driver 32a. (See FIG. 9)

Then, the main control unit 51 directs the galvanomirror 33a, which is a light beam actuator, so that the light beams scan about the central portion of the sensor pattern SA. Further, this control method was described in detail in Japanese Patent Application No. 9-245319 and therefore, the detailed explanation is omitted.

Thus, the light beams scan the central portion and around it of the sensor pattern SA.

The sensor pattern SA outputs current with the passage of light beams as described above. This output current is converted into voltage by the amplifier 61 and input to the integrator 42.

The integrator 42 integrates the output of the amplifier 61 and the integrated output is converted into digital data by the A/D converter 43.

Upon receipt of a conversion completion signal from the A/D converter 43, the main control unit 51 reads the output data of the A/D converter 43. In this case, for instance, the 12-bit A/D converter 43 is used and the power sensor characteristic as shown in FIG. 7 is obtained (the relation of A/D converted output with laser power).

For instance, when the light beams scan at 300 [$\mu$W], the A/D converted output becomes E4H (hexadecimal) That is, the laser power per 1 LBS. is equivalent to 0.3 [$\mu$W] (0.3 [$\mu$W/LSB]).

From the relation as mentioned above, the main control unit 51 adjusts the A/D converted output of the D/A converter in the laser driver 32a so that the A/D converted output becomes CE4±7H (hexadecimal), thereby controlling the laser oscillator 31a so as to obtain a desired light beam power. Further, in the case of multi-light beams, the above operation is executed with light beams and plural light beam powers to desired values.

Figure 19:
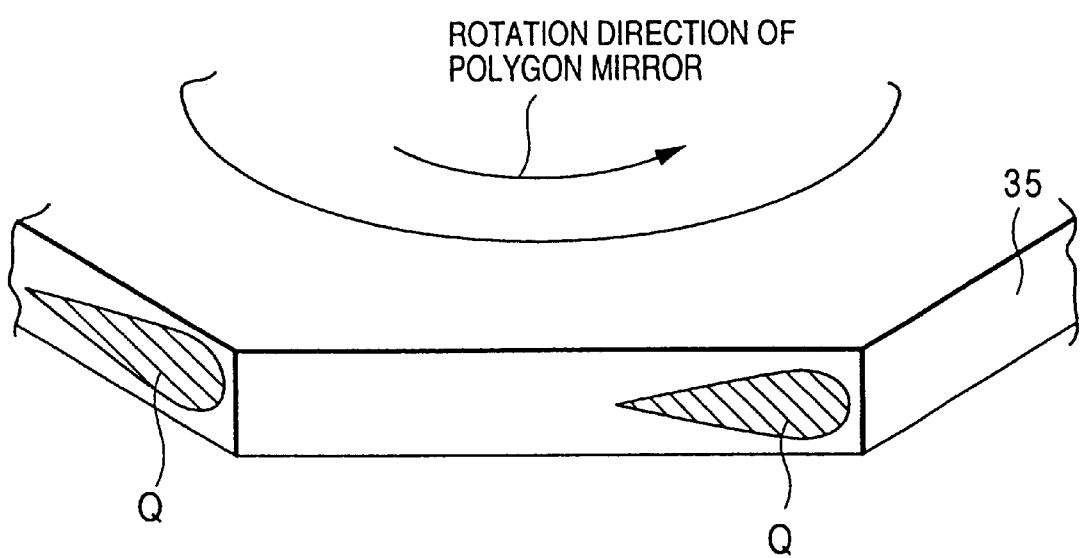
FIG. 19 is a diagram for explaining contamination of a polygon mirror.

By the way, the polygon mirror 36 normally rotates at a high speed of about 20,000 [rpm] and the mirror surface of the polygon mirror 35 is contaminated in many case with dust in the air and silicon generated from the fixing unit in the image forming apparatus. In particular, the edge portion at the top of the mirror in the rotating direction is remarkable. The contaminated state of the mirror surface is shown in FIG. 19. The portion near this edge is a portion to reflect the light beams when passing on the sensor pattern SA, and the contamination of this portion largely affects the light beam sensor characteristic.

When the light beam power control is executed in this state, defects as shown below are caused.

When the main control unit 51 sets 80H in the D/A converter in the laser driver 32a and have the laser oscillator 31a emit light at 300±15 [$\mu$W] and the polygon mirror 35 scan about the central portion of the sensor pattern SA for power sensing, part of light beams is reflected irregularly on the polygon mirror 35 due to the contaminated mirror surface, and the shape of light beams changes. When this changed shape light beams are focused on the sensor pattern SA, the quantity of light beam becomes less than an uncontaminated polygon mirror (the quantity of light reaching the light receiving surface of the sensor pattern SA decreases).

In this case, as the A/D converted output of the sensor pattern SA becomes sharply smaller than CE4H, the main control unit 51 makes an indication value of the D/A converter in the laser driver 32a large so that the A/D converted output becomes CE4H±7H. Although a power equivalent to 300 [$\mu$W] is thus obtained on the light receiving surface even when the mirror surface of the polygon mirror 35 is contaminated, as the mirror surface of the polygon mirror 35 for the image forming is not contaminated, the image forming unit forms an image with light beams of larger power than 300 [$\mu$W], causing collapsed portions on an output image and making image quality worse.

Further, the contamination on the polygon mirror 35 expands to the central portion of the mirror surface with the lapse of time. In this case, the light beam shape also changes on the image forming unit and the image quality is also deteriorated.

Further, when the polygon mirror 35 is remarkably contaminated, the quantity of light minimum required for the sensor pattern to operate cannot be secured and it is considered that even the light beam position cannot be controlled in some cases (as a matter of course, the image quality becomes worse).

Accordingly, it becomes necessary to sense the contamination of the polygon mirror 35. The contamination sensing method of the polygon mirror will be explained below in detail.

Figure 10:
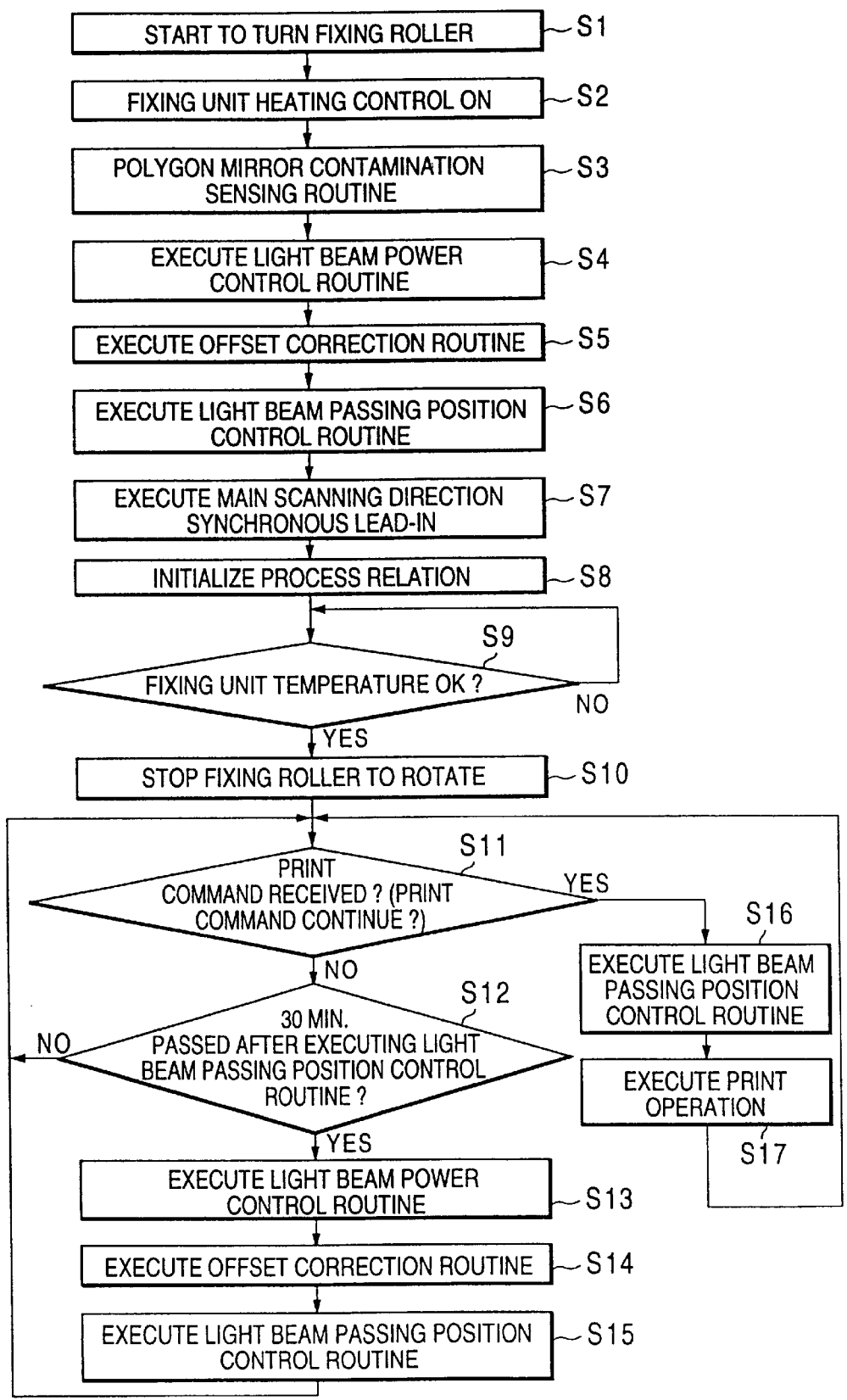
FIG. 10 is a flowchart for explaining the schematic operation when the power source is turned ON in a first embodiment.

FIG. 10 shows a flowchart for explaining the outline of the operations at the time when the power source of the printer unit is turned ON. Further, the operation of the scanner unit 1 is omitted.

First, when the power source of this copying machine is turned ON, the main control unit 51 rotates a fixing roller in the fixing unit 26 and starts to control the heating of the fixing unit 26 (S1 and S2). Then, the polygon mirror contamination sensing routine is executed and the contamination of the polygon mirror 35 is sensed(S3). Then, the light beam power control routine is executed and the light beam powers on the photosensitive drum 15 are controlled to the same level (S4).

When the powers for the light beams on the photosensitive drum 15 are controlled to the same level, an offset correction routine is executed and an offset value of the light beam sensor unit output processing circuit 40 is sensed and its correction process is performed (S5). Then, a light beam passing position control routine is executed (S6).

Then, the main control unit 51 executes the synchronous lead-in of the main scanning direction (S7) and then, rotates the photosensitive drum 15 and executes the initialization of the operations relative to the process to make conditions on the surface of the photosensitive drum 15, etc. definite(S8).

Thus, after executing a series of initializing processes, the fixing roller is continuously rotated until the temperature of the fixing unit 26 rises to a fixed temperature and the fixing unit becomes the standby state (S9). When the temperature of the fixing unit 26 rises to the fixed temperature, the rotation of the fixing roller is stopped (S10) and the fixing unit becomes a print command waiting state (S11).

When a print command is not received from a control panel (not shown) in the print command waiting state (S11), if, for instance, 30 min. passed (S12) after executing the light beam passing position control routine, the light beam power control routine is automatically executed (S13) and further, the offset correction routine is automatically executed (S14) and thereafter, the light beam passing position control routine is executed again (S15). When this is completed, the operation returns to Step S11 and again becomes the print command waiting state.

When a print command is received from the control panel (not shown) in the print command waiting state (S11), the light beam passing position control routine is executed (S16) and the print operation is executed (S17). When the print operation is completed, the operation returns to Step S11 and the operations shown above are repeated.

In the polygon mirror contamination sensing routing in Step S3, the output of the sensor patter SA for power sensing is monitored and the contamination of the polygon mirror 35 is sensed by comparing the output of the sensor pattern SA when the light beam is scanned at a fixed power at the time of shipment from factory (A/D converted value: Pini, an initial value) with the output of the sensor pattern SA when the contamination sensing is executed (A/D converted value: Pa).

The initial value Pini at the time of shipment from the factory is sensed according to a method shown below. At the time of shipment from the factory, the polygon mirror is not contaminated as a matter of course and the mirror surfaces are in the clean state. At this time, a fixed value (D/A converted value) 80H is set in the laser driver 32a of a specified laser oscillator (for example, the laser oscillator 31a) and emits laser beams to scan about the central portion of the sensor pattern SA, and the output of the sensor pattern SA at the time is made as an initial value. As the laser driver 32a is pre-adjusted to 300 [$\mu$W] at an indicated value 80H of the D/A converter, the output of the sensor pattern SA becomes Pini=CE4H. This value becomes an initial value.

Figure 11:
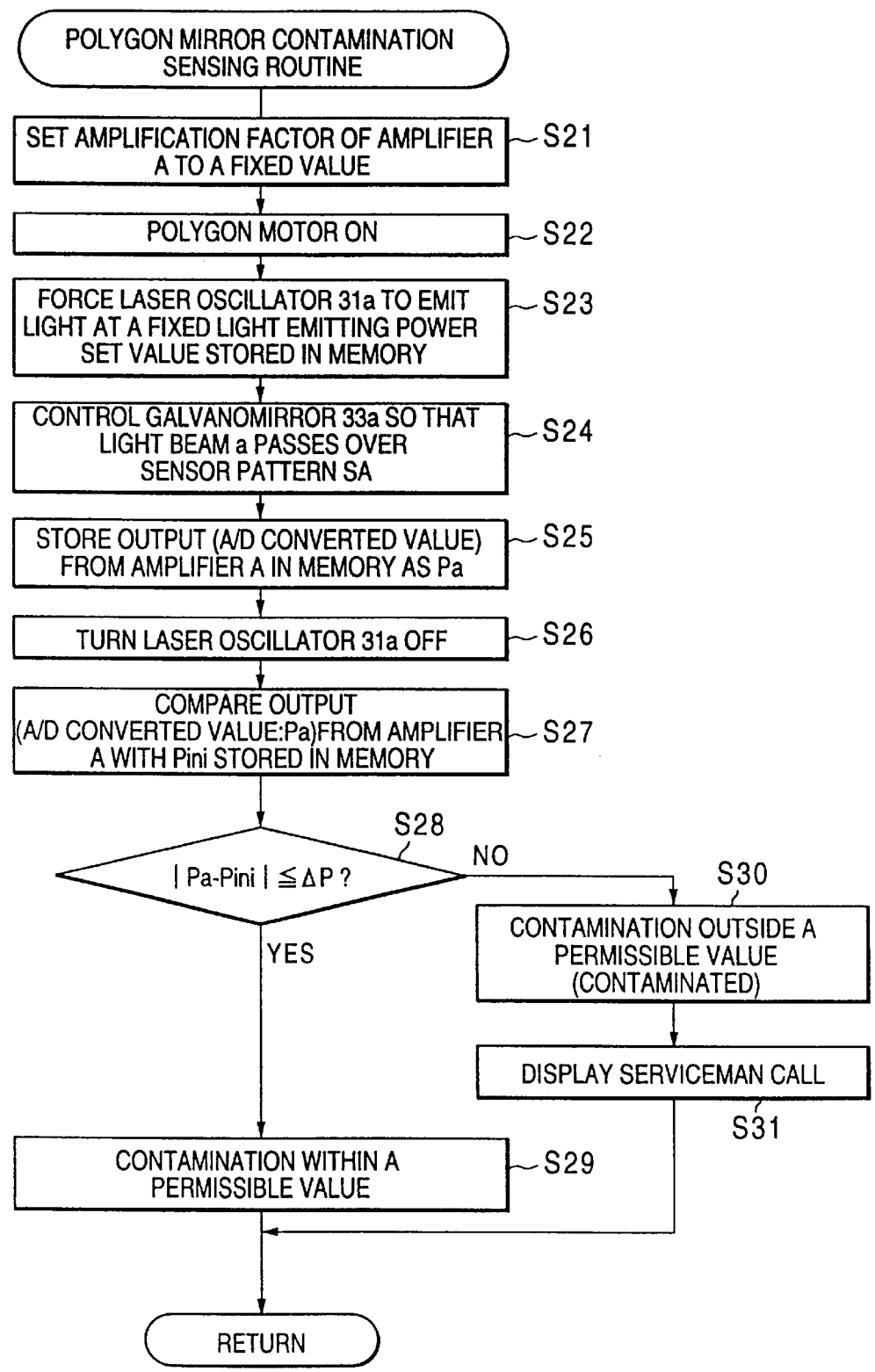
FIG. 11 is a flowchart for explaining the polygon mirror contamination sensing routine in a first embodiment.

The polygon mirror contamination sensing after the shipment from the factory is performed according to the steps of a flowchart shown in FIG. 11. Further, though FIG. 11 is an example to execute the contamination sensing prior to the power sensing, it is also possible to incorporate the contamination sensing routine in the power control.

First, after setting a fixed value for an amplification factor of the amplifier 61, the main control unit 51 rotates the polygon mirror 35 by turning the polygon motor 36 ON (S21–S22). Then, the main control unit 51 sets a fixed value (D/A converted value) 80H in the laser driver 32a of the laser oscillator 31a for scanning about the central portion of the sensor pattern SA for the power sensing, and reads the output of the sensor pattern SA at that time from the output of the A/D converter 43 (S23–S26). The contamination of the polygon mirror 35 is sensed by comparing this read A/D converted value (Pa) with the initial value Pini (S27).

That is, if a difference between the A/D converted value Pa and the initial value Pini is less than a permissible value ΔP, the contamination of the polygon mirror 35 is within the permissible value and does not affect the light beam control and the image forming operation adversely. So, the contamination sensing routine is terminated (S29).

On the other hand, if a difference between the A/D converted value Pa and the initial value Pini is larger than the permissible value ΔP, the contamination of the polygon mirror 35 is outside the permissible value and may possibly give an adverse effect to the light beam control and the image forming operation. Therefore, the main control unit 51 so indicates on the control panel (not shown) (for example, indicates a serviceman call, S30 and S31).

As explained above, with the expansion of the contaminated area of the mirror surface of the polygon mirror 35, the light beam power applied to the sensor pattern SA for the power sensing becomes small. Accordingly, an output value of the sensor pattern SA becomes small as a matter of course and thus the contamination of the polygon mirror 35 can be sensed.

As explained above, according to the first embodiment, before giving an adverse effect to the light beam control and the image forming operation, it becomes possible to sense the contamination of the polygon mirror 35 and by indicating a serviceman call on the control panel, it is possible to minimize the interruption of the user's work of the image forming apparatus.

Next, the polygon mirror contamination sensing method in a second embodiment of the present invention will be explained.

The second embodiment relates to a polygon mirror surface contamination sensing method likewise the first embodiment. Therefore, the explanation regarding the effect of contamination will be omitted. In the second embodiment, the contamination on the mirror surface of the polygon mirror 35 is sensed by comparing the indicating value (Dini) to the D/A converter of the laser diver at the shipment from the factory with an indicating value (Da) to the D/A converter of the laser driver after sensing the contamination after the shipment from the factory.

The initial value when shipped from the factory is an indicating value to the D/A converter of the pre-adjusted laser driver. In this embodiment, the indicating value to the D/A converter of the laser driver 32a is 80H (Dini: 80H). The laser oscillator 31a has been adjusted to emit light at 300 [μW] at this value (Dini: 80H) on the sensor pattern SA. Therefore, the output of the sensor pattern SA (the output of the A/D converter 43) becomes CE4H when the laser oscillator 31a emits light at the indicating value 80H to the D/A converter of the laser driver 32a and about the central portion of the sensor pattern SA for the power sensing is scanned.

Figure 12:
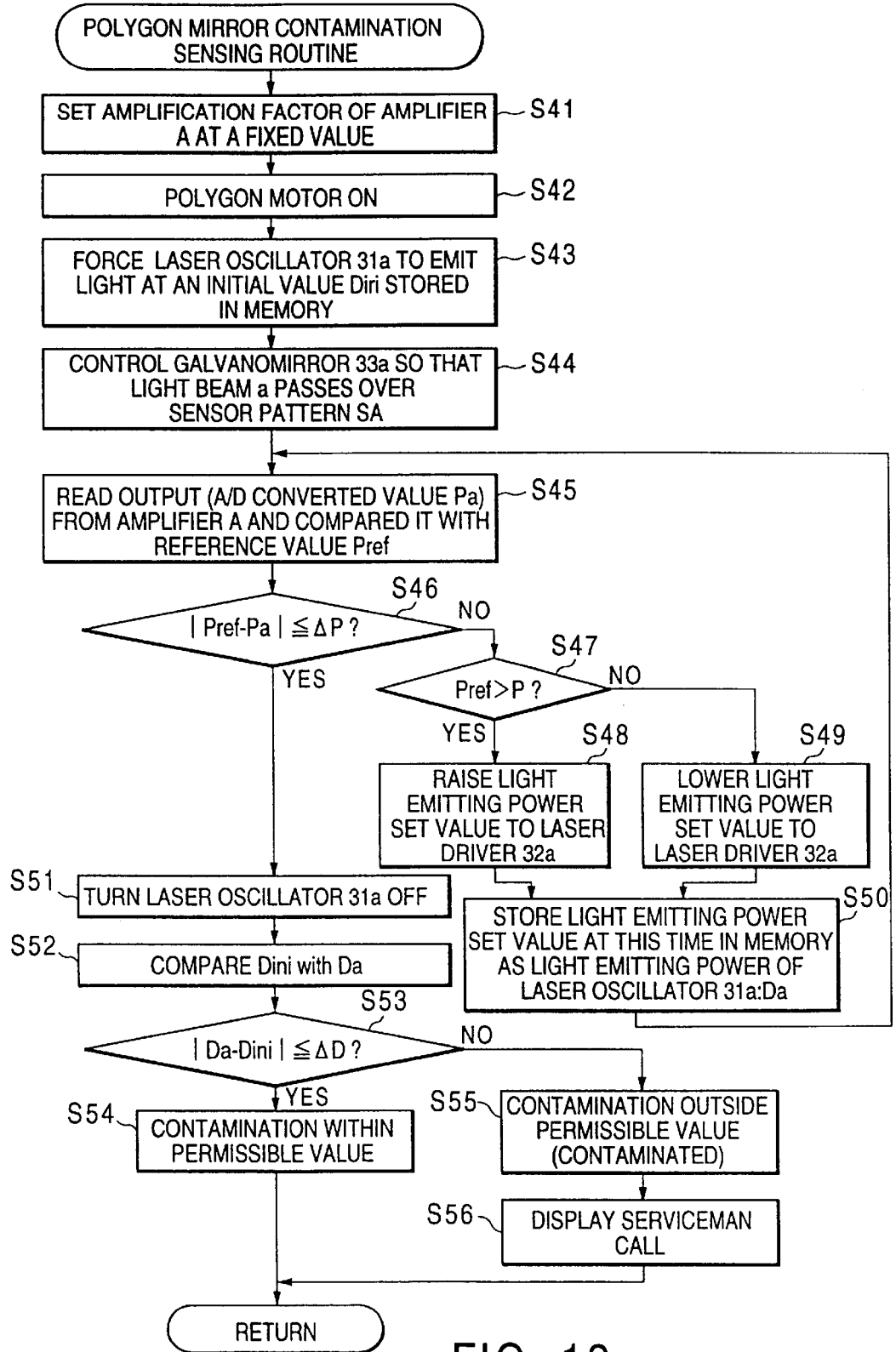
FIG. 12 is a flowchart for explaining the polygon mirror contamination sensing routine in a second embodiment.

The contamination of the polygon mirror 35 after shipped from the factory is sensed according to the steps of a flowchart shown in FIG. 12. Further, FIG. 12 shows an example to execute the contamination sensing prior to the power sensing. It is also possible to incorporate a contamination sensing routine in a part of the power control.

First, after setting the amplification factor of the amplifier 61 at a fixed value, the main control unit 51 turns the polygon motor 36 ON and rotates the polygon mirror 35 (S41–S42). Then, the main control unit 51 makes the laser oscillator 31a emit light at 300±15 [μW] by setting the initial value Dini: 80H in the D/A converter of the laser driver 32a of the laser oscillator 31a (S43).

Then, the main control unit 51 makes the galvanomirror 33a operate so that the light beams scan around the central portion of the sensor pattern SA. The main control unit 51 reads the output (Pa) of the sensor pattern SA at this time from the output of the A/D converter 43 and adjusts an indicating value to the D/A converter of the laser driver 32a so that a difference with the reference value Pref becomes less than ΔP (S45–S51).

However, when a part of light beams is irregularly reflected on the polygon mirror 35 due to the contamination thereof, the shape of light beams changes and this light beams are focussed on the sensor pattern SA, the quantity of light beams decreases when compared with that on the polygon mirror 35 not contaminated (the quantity of light reaching the light receiving surface of the sensor pattern SA decreases).

In this case, as the A/D converted output of the sensor pattern SA becomes sharply less than CE4H, the main control unit 51 increases an indicating value Da to the D/A converter of the laser driver 32a so that a difference with the reference value Pref becomes below ΔP.

Then, the contamination of the polygon mirror 35 can be sensed by comparing the indicating value Da with the initial value Dini. That is, if a difference between the indicating value Da and the initial value Dini is less than the permissible value ΔD, an dverse effect is not given to the light beam control and the image forming operation and therefore, the contamination sensing routine is terminated (S52–S54).

On the other hand, if a difference between the indicating value Da and the initial value Dini is larger than the permissible value ΔD, the contamination of the polygon mirror 35 is outside the permissible value and an adverse effect is given to the light beam control and the image forming operation and therefore, the main control unit 51 displays the serviceman call on the control panel (not shown) (S55–S56).

As explained above, according to the second embodiment, it becomes possible to sense the contamination of the polygon mirror 35 before an adverse effect is given to the light beam control and the image forming operation and by displaying the serviceman call, it becomes possible to minimize the interruption of user's work of the image forming apparatus.

Next, a third embodiment of the present invention will be explained.

When the polygon mirror 35 is contaminated and the light beam power is controlled by the sensor pattern SA for the power sensing so as to obtain a desired power by the light beams reflected on the contaminated area, an image is formed in a power that is larger than the original power in the area where an image is formed with the light beams reflected on the uncontaminated area of the polygon mirror 35 and therefore, the image density becomes thick, characters are collapsed and image quality is worsened.

So, if the light beams are controlled based on the initial value of the laser driver 32a without using the sensor pattern SA for the power sensing, the light beams reflected on the contaminated mirror surface of the polygon mirror 36 are applied to the sensor pattern Sa and therefore, the light beam power that is sufficient enough for executing the light beam sub-scanning position control and the main scanning synchronous timing control is not obtained and even the image formation cannot possibly be made.

In the third embodiment, light beam power when executing the light beam control is decided based on the output of the sensor pattern SA for the power sensing. On the other hand, light beam power for the image forming is decided based on the initial value of the laser driver 32a.

The third embodiment will be explained below in detail.

Figure 13:
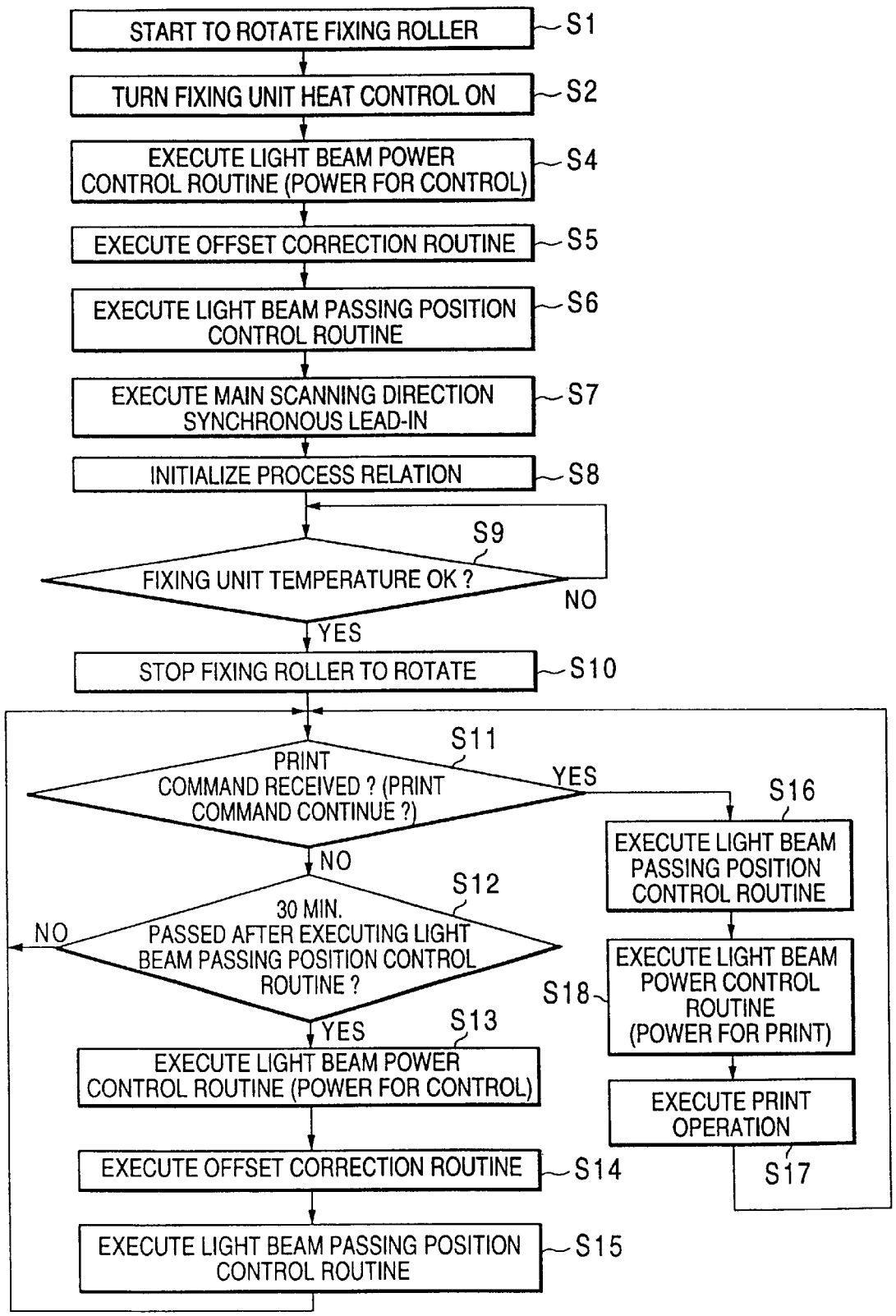
FIG. 13 is a flowchart for explaining the schematic operation when the power source is turned ON in a third embodiment.

FIG. 13 shows the outline of the flow of the operations from the power ON to the image forming. The basic flow is similar to the flowchart previously shown in FIG. 10. In FIG. 13, Steps S4–S7, S13–S15 and S16 relate to the light beam position control. The light beam power when performing these operations is controlled by the light beam power control routine in Steps S4 and S13. In Step S4, the light beam power is controlled based on the output of the sensor pattern SA for the power sensing (The D/A converted value of the laser driver 32a is changed so that the output of the sensor pattern SA for the power sensing becomes CE4H±α).

When the polygon mirror 35 is contaminated, the light beam power is controlled by the above operation according to the output of the sensor pattern SA for the power sensing and the light beams are controlled so that a desired power is obtained by the light beams reflected on the contaminated area of the polygon mirror 35 and therefore, the light beam power sufficient enough for executing the light beam sub-scanning position control and the main scanning synchronous timing control is obtained and the light beam power can be controlled similarly to that when the polygon mirror 35 is not contaminated.

When the light beam controls are all completed and units relative to the process, temperature of the fixing unit, etc. are turned to the ready to print state, the machine becomes in the print command waiting state (S11). When a print command is received here, the light beam passing position control routine is executed again (S16). Thereafter, the print power control is performed (S18) and the print operation is executed (S17).

Figure 14:
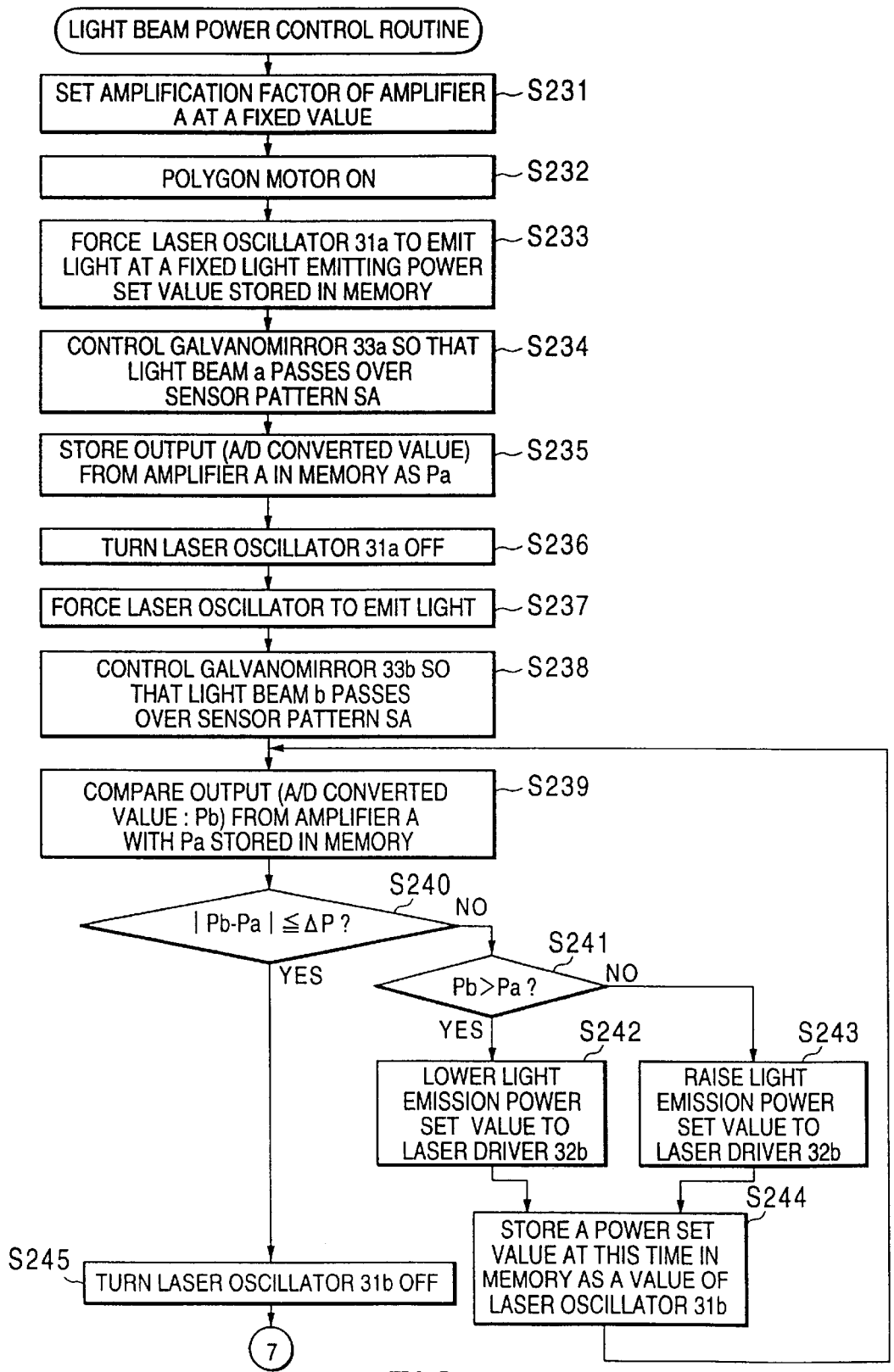
FIG. 14 is a flowchart for explaining a copying power control routine in a third embodiment.
Figure 15:
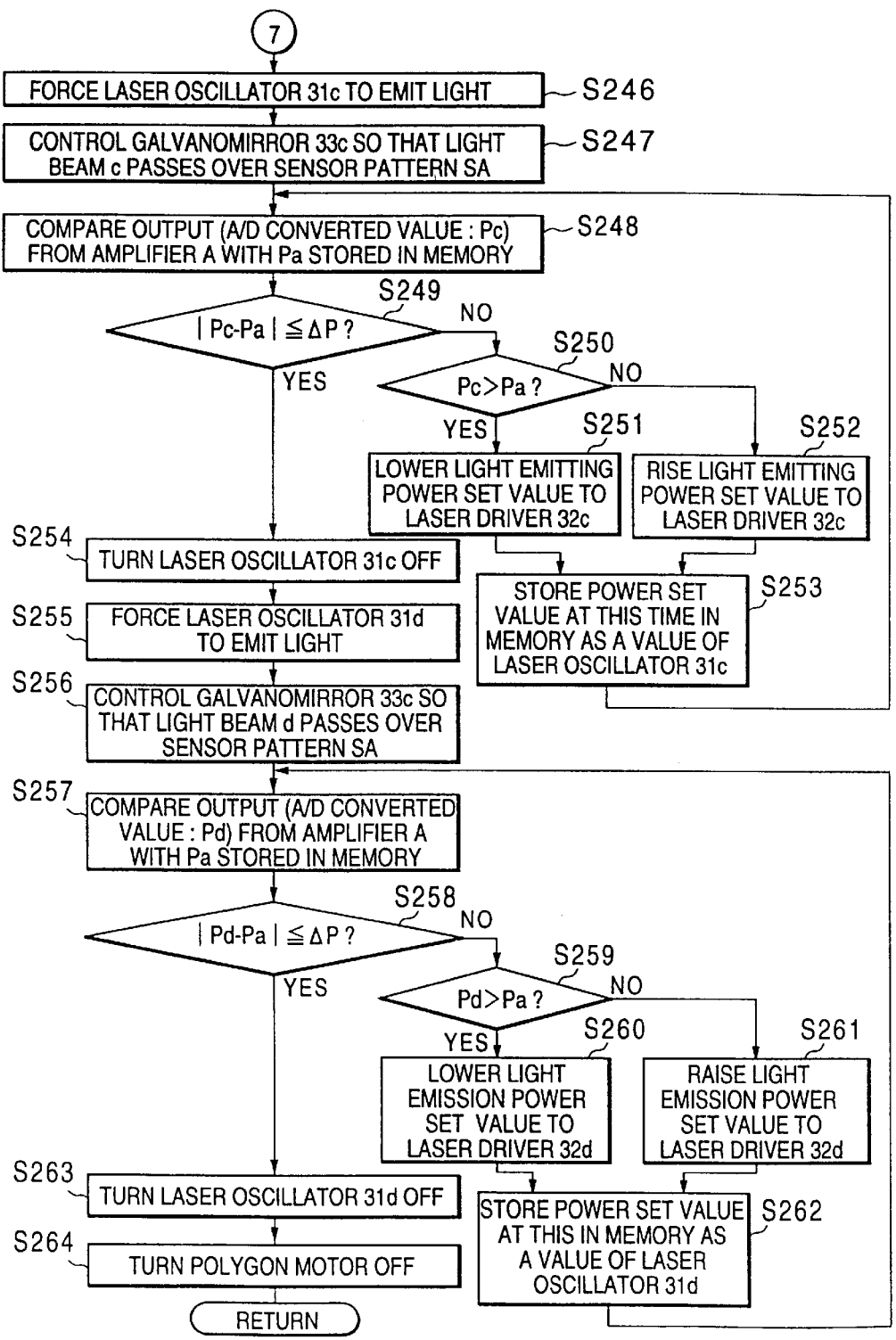
FIG. 15 is a flowchart for explaining the copying power control routine in a third embodiment.

The details of the print power control in Step S18 are shown in the flowchart in FIG. 14 and FIG. 15. The points of this flowchart are the steps shown below.

Steps S233–S235: Set 80H for the D/A converter of the laser driver 32a of the laser oscillator 31a and force to emit the light beam a at 300±15 [$\mu$W]. The laser oscillator 31a is adjusted when shipped from the factory so as to emit 300 [$\mu$W] on the sensor pattern SA at the indicating value: 80H to the D/A converter of the laser driver 31a and therefore, the output of the sensor pattern SA when around the central portion of the sensor pattern SA for the power sensing is scanned by the light beam a becomes CE4H if the polygon mirror 35 is not contaminated. Further, if the polygon mirror 35 is contaminated, the output value will be different from the above value. This value is assumed to be Pa. Based on this Pa, the power control of remaining light beams b, c and d is executed.

Steps S237–S245: In these steps, the power control of light beam b is executed. In these steps, based on the Pa, an indicating value to the D/A converter of the laser driver 32b is changed so that the output (A/D converted value) of the sensor pattern SA for the power sensing of light beam b falls in a specified range.

Steps S246–S254: The steps to execute the power control of light beam c. In these steps, based on the Pa, an indicating value to the D/A converter of the laser driver 32c is changed so that the output (A/D converted value) of the sensor pattern SA for the power sensing of light beam d falls in a specified range.

Steps S255–S263: The steps to execute the power control of light beam d. In these steps, based on the Pa, an indicating value to the A/D converter of the laser driver 32d is changed so that the output (the A/D converted value) of the sensor pattern SA for the power sensing of light beam d falls in a specified range.

Further, for the details of the light beam power control, refer to, for instance, Japanese Patent Application No. 9-245319.

Even when the polygon mirror 35 is contaminated, the power is controlled in the above operation based on the pre-adjusted light beam a and therefore, the density of an image for the image forming does not become deep nor characters are collapsed.

Next, a fourth embodiment of the present invention will be explained.

In the fourth embodiment, a threshold value of the digitizing circuit 53 is varied according to the light beam power. This digitizing circuit 53 digitizes the outputs (analog signals) of the sensor patterns S1, S2 for obtaining timing signals governing the light beam passing position sensing operation and the light beam power sensing operation.

Even when the light beam power (quantity of light) is changed, proper timings can be always obtained in the fourth embodiment, the proper light beam position sensing and the light beam power sensing become possible and an image of high quality is obtained.

Figure 6:
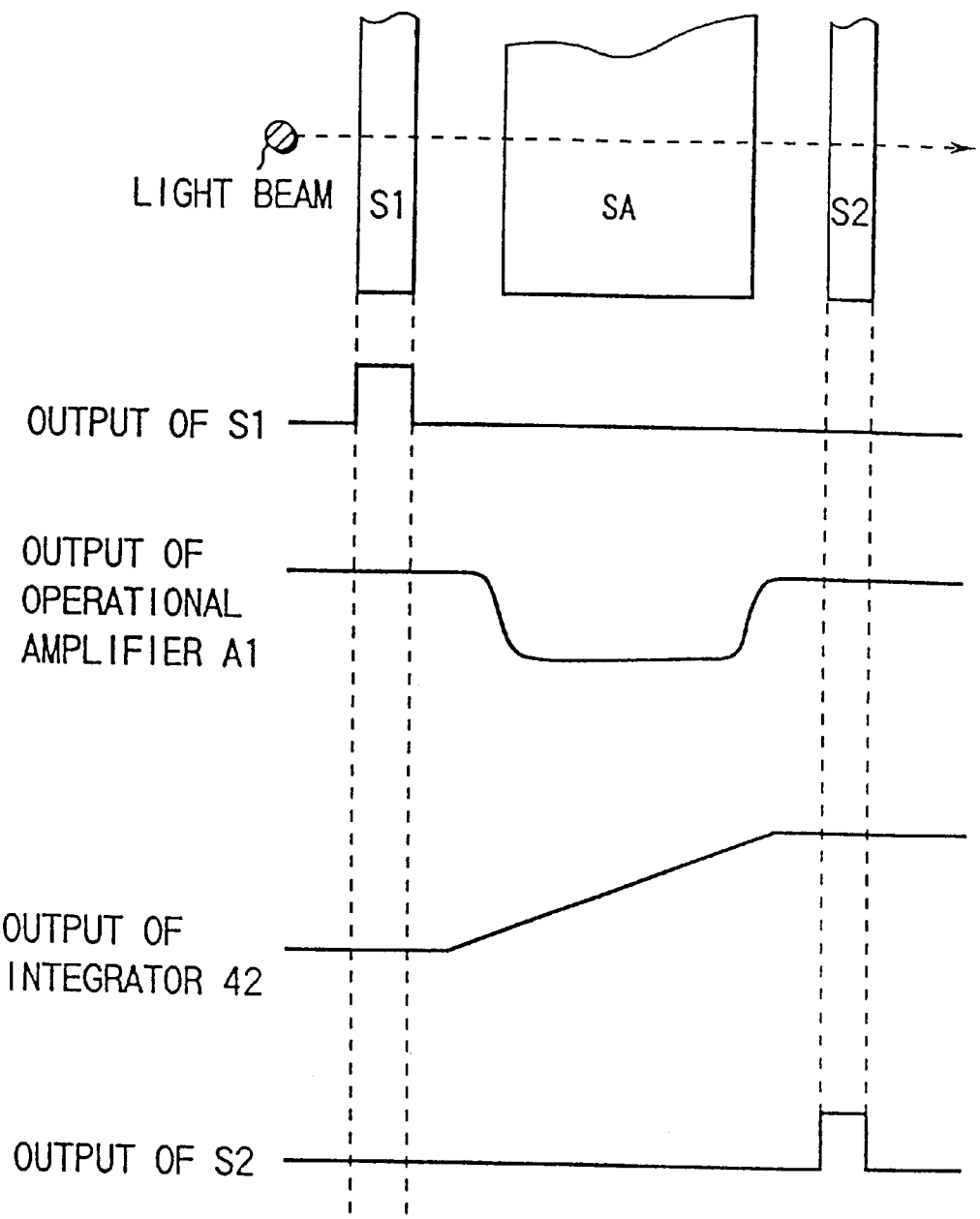
FIG. 6 is a signal waveform diagram of essential parts for explaining the operation of a power sensor unit.

As explained in FIG. 6, the light beam passing position sensing and the light beam power sensing operations are based on the timing signals obtained from the sensor patterns S1 and S2. That is, as explained above, the sensor pattern S1 generates a reset signal for discharging the integrator 42 and the sensor pattern S2 generates a conversion start signal of the D/A converter 43 for digitizing an integral output (analog signal). These signal timings are dependent upon the arrangement of the sensor patterns S1, S2, light beam scanning speed, light beam power and the like.

In the fourth embodiment, the timings for the reset of the integrator 42 and the starting of the A/D converter 43 are controlled based on the timings of light beams to pass the sensor pattern S1 or S2. That is, the output of the sensor pattern S1 or S2 is digitized in the digitizing circuit 53 and input into the integrator 42 and the A/D converter 43.

Figure 16:
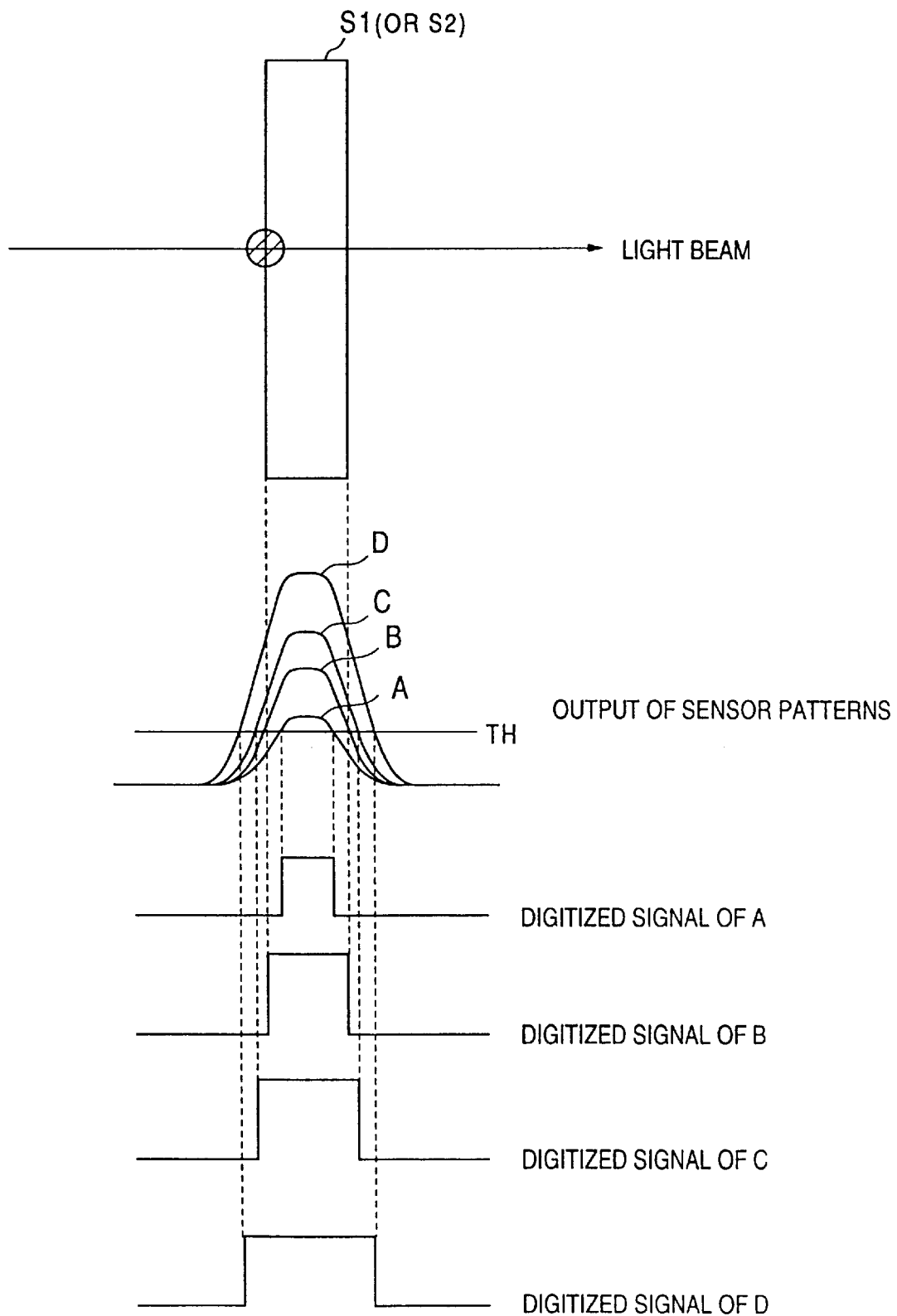
FIG. 16 is a signal waveform diagram for explaining a difference of a timing signal sensing pattern by size of light beam power in a fourth embodiment.

FIG. 16 shows the variance of the output of the sensor pattern S1 (S2) for the timing signals depending on the magnitude of light beam power. This figure shows the sensor output patter outputs differing in 4 stages (A, B, C and D) and the digitized signals that are digitized from these outputs in the digitizing circuit 53. The sensor pattern output (analog signal) A is when the light beam power is small and becomes the most small mountain shape among four outputs. When this sensor pattern output A is digitized at the threshold level TH as illustrated, it becomes a small pulse signal (a digitized signal of A).

On the contrary, the sensor pattern output D is when the light beam power is large and becomes the most large mountain shape among four outputs. When this sensor pattern output D is similarly digitized at the threshold level TH as shown, it becomes the most large pulse signal (a digitized signal of D).

By the way, the photosensitive drum generally deteriorates its sensitivity as a result of secular change and fatigue with the lapse of time. Therefore, depending to a degree of the deterioration of sensitivity, the light beam power (quantity of light) at the time of image formation is made large. However, when the light beam power becomes large, the output timing of the sensor pattern S1 (S2) for the timing signal changes.

Figure 17:
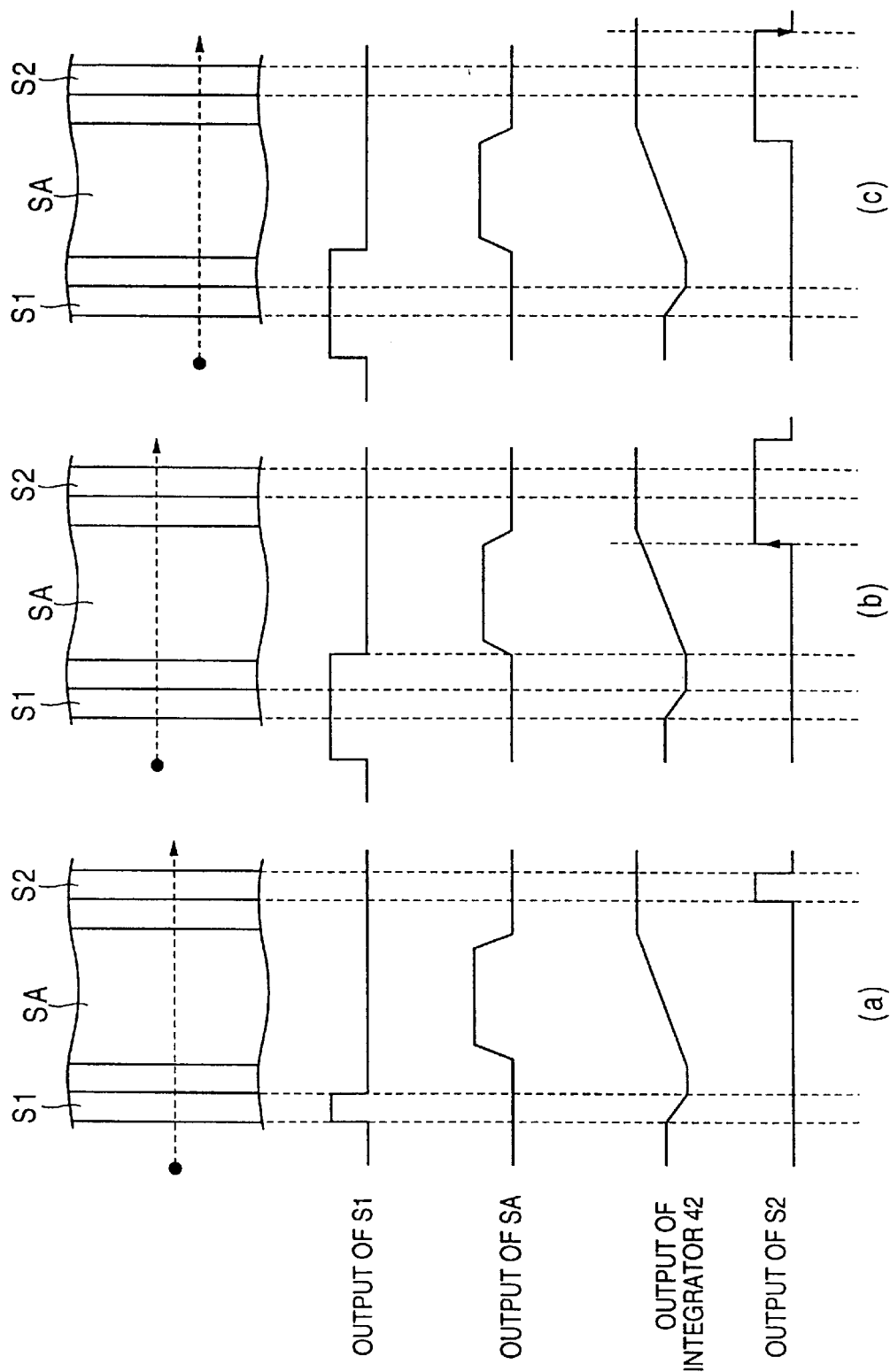
FIG. 17 is a signal waveform diagram of essential parts for explaining the operation of the power sensor unit when the light beam power is changed in a fourth embodiment.

That is, in the case of FIG. 17(b), the pulse width of the digitized output of the sensor pattern S1 may expand and the integrator 4 may be reset up to the sensor pattern SA area. In this case, as the integrator 42 is not able to integrate all outputs of the sensor pattern SA. The light beam power output is smaller than the original magnitude.

Similarly, when the pulse width of the digitized output of the sensor pattern S2 expands and the A/D conversion of the A/D converter 43 is started at the leading edge of the sensor pattern S2 output, the conversion start timing becomes faster than the ordinary timing. Therefore, the A/D conversion is started in the state where the integration is not fully completed and the light beam power output becomes smaller than the original magnitude (FIG. 17(b)).

Further, when the A/D conversion is started at the trailing edge of the sensor pattern S2 output, the conversion start timing becomes slower than the ordinary timing and therefore, an error becomes large due to the droop of an integrating capacitor (discharge of an integrating capacitor) (FIG. 17(c)). Further, FIG. 17(a) shows the normal state.

So, in the fourth embodiment, by varying the threshold value of the digitizing circuit 53 with the increase of light beam power, the output pulse widths of the sensor patterns S1 and S2 are kept constant and the deterioration of accuracy in the light beam passing position sensing/control and the light beam power sensing/control is prevented and output image can be improved to the high quality level.

Figure 18:
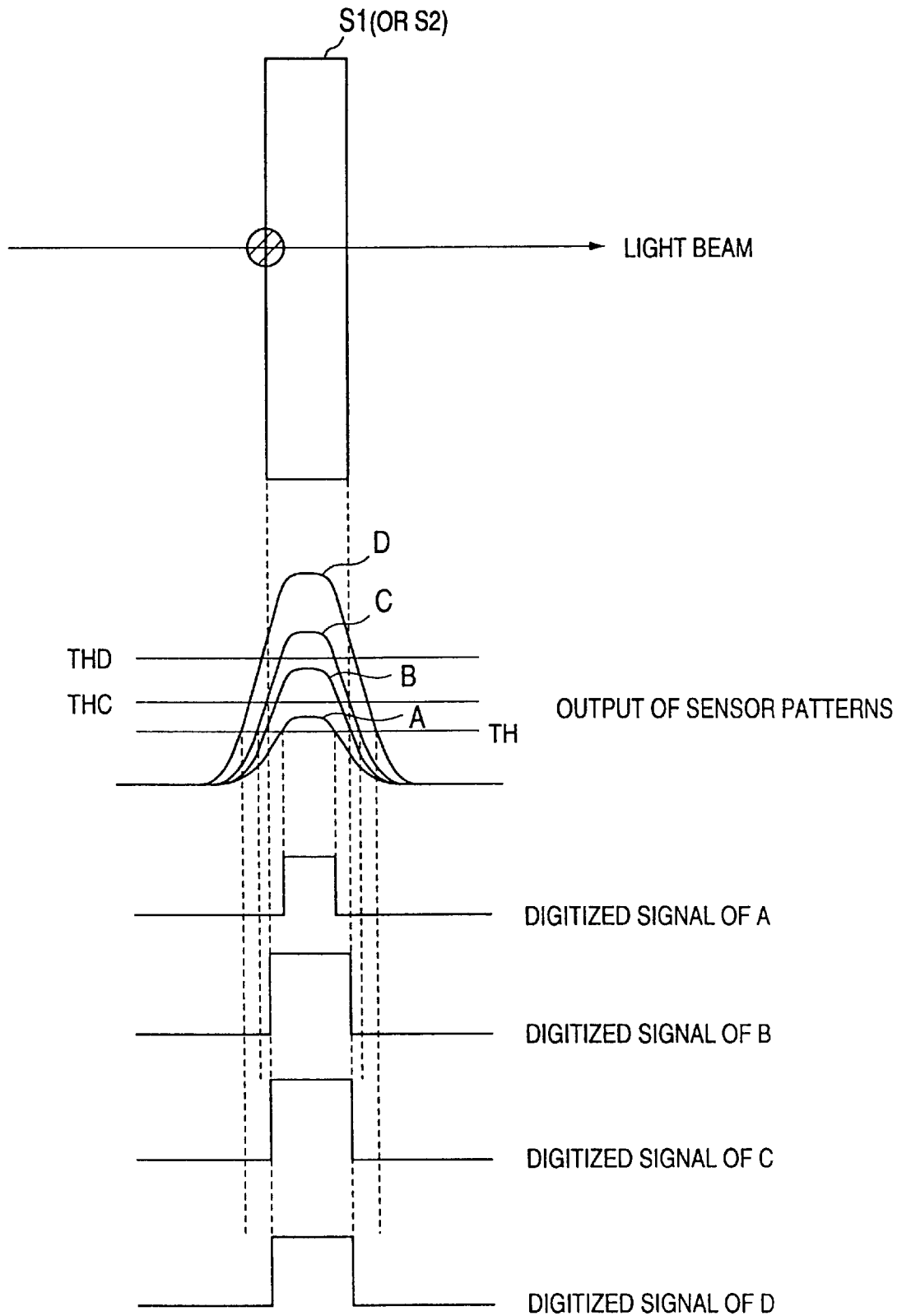
FIG. 18 is a signal waveform diagram for explaining the output of a timing signal sensing pattern and its digitizing output in a fourth embodiment.

For instance, in FIG. 18, the sensor pattern output B is assumed to be in the initial state (the state at the shipment). At the time when shipped, the light beam scanner unit was designed and adjusted so as to operate in this state. If the light beam power increased with the lapse of time, the outputs of the sensor patterns S1 and S2 became the sensor pattern output C, a digitized signal similar to the state of the sensor pattern output B is obtained when the threshold value of the digitizing circuit 53 is made to THC. Further, similarly, when the outputs of the sensor pattern S1 and S2 are the sensor pattern output D (the most large light beam power among the outputs A–D), the digitized signal similar to the state of the sensor pattern output B is obtained by making the threshold value of the digitizing circuit 53 to THD. That is, as a timing signal similar to the initial state is obtained even when the light beam power (quantity of light) is made large, deterioration of accuracy in the light beam power control can be prevented.

As explained above, according to the fourth embodiment, since a proper timing signal can be always obtained even when the light beam power (quantity of light) is changed, the proper light beam passing position and the light beam power can be detected and controlled, and an image of high quality is obtained.

According to the present invention as described above, it is possible to provide a light beam scanner unit and an image forming apparatus that are capable of preventing deterioration of the image quality caused by a contaminated polygon mirror and minimizing the interruption of the image forming operation caused by the contaminated polygon mirror.

Further, according to the present invention, it is possible to provide a light beam scanner unit and an image forming apparatus that are capable of sensing a proper light beam passing positions and light beam power, and forming images of high quality.

What is claimed is:

1. A light beam scanner unit comprising:
    generating means for generating a light beam;
    scanner means for reflecting the light beam from the generating means toward a scanning surface to scan the scanning surface by the light beam;
    timing sensor means for sensing a passing timing of the light beam scanning the scanning surface with the scanner means to output an output signal;
    digitizing means for digitizing the output signal from the timing sensor means by a variable threshold value;
    position sensing means for sensing a passing position of the light beam in a direction orthogonal to a scanning direction of the light beam to scan the scanning surface by the scanner means based on an output of the digitizing means;
    passing position control means for controlling a passing position of the light beam on the scanning surface to be scanned by the scanner means based on a sensing result of the position sensing means so that the passing position of the light beam becomes a proper position;
    power sensor means for sensing a power of the light beam, which scan the scanning surface, based on the output of the digitizing means;
    power control means for controlling the generating means based on a sensing result of the power sensor means so that the power of the light beam becomes a fixed value; and
    threshold value control means for changing and controlling the threshold value of the digitizing means according to a light beam power control volume by the power control means.

2. An image forming apparatus which forms an image on an image carrier by scanning and exposing the image carrier with a light beam, comprising:
    generating means for generating the light beam pre-adjusted initially to an initial value so as to generate the light beams at a desired power;
    scanner means for reflecting the light beam from the generating means toward the image carrier to scan the image carrier with the light beam;
    position sensing means for sensing a passing position of the light beam in a direction orthogonal to a scanning direction of the light beam to scan the image carrier by the scanner means;
    power sensing means for sensing a power of the light beam scanning on the image carrier with scanner means;
    passing position control means for controlling a passing position of the light beam on the image carrier to be scanned by the scanner means based on a sensing result of the position sensing means so that the passing position of the light beam becomes a proper position;
    first power control means for controlling the generating means based on a sensing result of the power sensor means so that the power of the light beam becomes a fixed value when the controlling the passing position of the light beam on the image carrier by the passing position control means; and
    second power control means for controlling the generating means based on the initial value so that the power of the light beam scanning the image carrier becomes a fixed value when forming an image on the image carrier.

3. An image forming apparatus which forms an image on an image carrier by scanning and exposing the image carrier with a light beam, comprising:

generating means for generating a light beam;

scanner means for reflecting the light beam from the generating means toward the image carrier to scan the image carrier with the light beam;

passing timing sensor means for sensing a passing timing of the light beam scanning the image carrier with the scanner means;

digitizing means for digitizing an output signal from the passing timing sensor means with a variable threshold value;

position sensing means for sensing a passing position of the light beam in a direction orthogonal to a scanning direction of the light beam to scan the image carrier by the scanner means based on an output of the digitizing means;

passing position control means for controlling a passing position of the light beam on the image carrier to be scanned by the scanner means based on a sensing result of the position sensing means so that the passing position of the light beam becomes a proper position; and threshold value control means for changing and controlling the threshold value of the digitizing means according to change in characteristic of the image carrier.

4. An image forming apparatus according to claim 3, further comprising:

power sensor means for sensing a power of the light beam, which scan the image carrier, based on the output of the digitizing means.

5. An image forming apparatus according to claim 3, further comprising:

power control means for controlling the generating means based on a sensing result of the power sensor means so that the power of the light beam becomes a fixed value.

6. A method of controlling a passing position and a power of a light beam in a scanner unit, comprising the steps of:

generating a light beam;

reflecting the light beam generated in the generating step toward a scanning surface to scan a scanning surface by the light beam;

sensing a passing timing of the light beam scanning the scanning surface to output an output signal;

digitizing the output signal by a variable threshold value;

sensing a passing position of the light beam in a direction orthogonal to a scanning direction of the light beam to scan the scanning surface based on an output of the digitizing step;

controlling a passing position of the light beam on the scanning surface to be scanned based on a sensing result of the position sensing step so that the passing position of the light beam becomes a proper position;

sensing a power of the light beam, which scan the scanning surface, based on the output of the digitizing step;

controlling the generating step based on a sensing result of the power sensing step so that the power of the light beam becomes a fixed value; and changing and controlling the threshold value of the digitizing step according to a light beam power control volume by the power control step.

* * * * *